United States Patent
Ikonin et al.

(10) Patent No.: US 10,841,605 B2
(45) Date of Patent: Nov. 17, 2020

(54) APPARATUS AND METHOD FOR VIDEO MOTION COMPENSATION WITH SELECTABLE INTERPOLATION FILTER

(71) Applicant: Huawei Technologies Co., Ltd., Shenzhen (CN)

(72) Inventors: Sergey Yurievich Ikonin, Moscow (RU); Maxim Borisovitch Sychev, Moscow (RU); Victor Alexeevich Stepin, Moscow (RU); Roman Chernyak, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 15/933,974

(22) Filed: Mar. 23, 2018

(65) Prior Publication Data

US 2018/0220148 A1    Aug. 2, 2018

Related U.S. Application Data

(63) Continuation of application No. PCT/RU2015/000614, filed on Sep. 25, 2015.

(51) Int. Cl.
*H04N 19/51* (2014.01)
*H04N 19/11* (2014.01)
(Continued)

(52) U.S. Cl.
CPC .......... *H04N 19/51* (2014.11); *H04N 19/176* (2014.11); *H04N 19/523* (2014.11); *H04N 19/82* (2014.11)

(58) Field of Classification Search
CPC ....... H04N 19/51; H04N 19/82; H04N 19/523
(Continued)

(56) References Cited

U.S. PATENT DOCUMENTS 6,175,656 B1   1/2001 Hoang
7,266,150 B2   9/2007 Demos
(Continued)

FOREIGN PATENT DOCUMENTS

CN       1663258 A     8/2005
CN     103238320 A     8/2013
(Continued)

OTHER PUBLICATIONS

Sychev et al., "Sharpening Filter for Interlayer Prediction," IEEE Visual Communications and Image Processing Conference, XP032741195, pp. 470-473, Institute of Electrical and Electronics Engineers, New York, New York (2014).
(Continued)

*Primary Examiner* — Jeffery A Williams
(74) *Attorney, Agent, or Firm* — Leydig, Voit & Mayer, Ltd.

(57) ABSTRACT

The present disclosure relates to a video coder for predictive coding a video stream of subsequent frames according to motion compensation into an encoded video bit stream, comprising a frame buffer configured to store at least one reference frame of the video stream, a prediction unit configured to generate a prediction block of a current block of a current frame from a reference block of the reference frame according to a motion vector having fractional-pel resolution, the fractional-pel resolution defining an integer-pel position and fractional-pel positions. The prediction unit is configured to interpolate the reference block according to the fractional-pel resolution via one of the at least three following interpolation filters: a blurring interpolation filter, a tap filter, and the tap filter followed by a sharpening filter.

31 Claims, 11 Drawing Sheets

(51) Int. Cl.
*H04N 19/82* (2014.01)
*H04N 19/523* (2014.01)
*H04N 19/176* (2014.01)

(58) Field of Classification Search
USPC .................................................. 375/240.16
See application file for complete search history.

(56) References Cited

U.S. PATENT DOCUMENTS

| | | | |
|---|---|---|---|
| 8,705,622 B2 | 4/2014 | Ye et al. | |
| 8,780,971 B1 | 7/2014 | Bankoski et al. | |
| 2002/0063807 A1 | 5/2002 | Margulis | |
| 2003/0194010 A1 | 10/2003 | Mukerjee et al. | |
| 2004/0213470 A1 | 10/2004 | Sato et al. | |
| 2005/0147316 A1 | 7/2005 | Deshpande | |
| 2005/0243913 A1 | 11/2005 | Kwon et al. | |
| 2007/0091997 A1 | 4/2007 | Fogg et al. | |
| 2008/0089417 A1 | 4/2008 | Bao et al. | |
| 2008/0109041 A1 | 5/2008 | De Voir | |
| 2008/0205508 A1 | 8/2008 | Ziauddin et al. | |
| 2009/0257499 A1* | 10/2009 | Karczewicz | H04N 19/70 375/240.16 |
| 2010/0002770 A1 | 1/2010 | Motta et al. | |
| 2010/0008430 A1 | 1/2010 | Karczewicz et al. | |
| 2010/0053689 A1* | 3/2010 | Ohwaku | H04N 1/40068 358/3.27 |
| 2010/0111182 A1 | 5/2010 | Karczewicz et al. | |
| 2010/0128995 A1 | 5/2010 | Drugeon et al. | |
| 2010/0284458 A1 | 11/2010 | Andersson et al. | |
| 2011/0096236 A1 | 4/2011 | Ngan et al. | |
| 2011/0299604 A1 | 12/2011 | Price et al. | |
| 2011/0317764 A1 | 12/2011 | Joshi et al. | |
| 2012/0170650 A1* | 7/2012 | Chong | H04N 19/593 375/240.12 |
| 2012/0200669 A1 | 8/2012 | Lai et al. | |
| 2012/0307900 A1 | 12/2012 | Demos | |
| 2013/0003845 A1 | 1/2013 | Zhou et al. | |
| 2013/0034165 A1 | 2/2013 | Sasai et al. | |
| 2013/0070858 A1 | 3/2013 | Demos | |
| 2013/0077697 A1 | 3/2013 | Chen et al. | |
| 2013/0182780 A1* | 7/2013 | Alshin | H04N 19/117 375/240.29 |
| 2013/0215974 A1 | 8/2013 | Chong et al. | |
| 2014/0044161 A1 | 2/2014 | Chen et al. | |
| 2014/0072048 A1 | 3/2014 | Ma et al. | |
| 2014/0133546 A1 | 5/2014 | Bandoh et al. | |
| 2014/0192862 A1 | 7/2014 | Flynn et al. | |
| 2014/0192865 A1 | 7/2014 | Zhang et al. | |
| 2014/0254680 A1 | 9/2014 | Ho et al. | |
| 2015/0078448 A1 | 3/2015 | Puri et al. | |
| 2015/0116539 A1 | 4/2015 | Nayar et al. | |
| 2015/0124864 A1 | 5/2015 | Kim et al. | |
| 2015/0237358 A1 | 8/2015 | Alshin et al. | |
| 2016/0014411 A1 | 1/2016 | Sychev | |
| 2016/0105685 A1 | 4/2016 | Zou et al. | |
| 2018/0048910 A1 | 2/2018 | Kalevo et al. | |
| 2019/0215515 A1 | 7/2019 | Sychev | |

FOREIGN PATENT DOCUMENTS

| | | |
|---|---|---|
| CN | 103650509 A | 3/2014 |
| CN | 104937941 A | 9/2015 |
| EP | 1841230 A1 | 10/2007 |
| EP | 2111719 B1 | 8/2014 |
| EP | 2819413 A1 | 12/2014 |
| EP | 2860980 A1 | 4/2015 |
| JP | 2001057677 A | 2/2001 |
| JP | 2003333604 A | 11/2003 |
| JP | 2004007337 A | 1/2004 |
| JP | 2006067213 A | 3/2006 |
| JP | 2006513592 A | 4/2006 |
| JP | 2008054267 A | 3/2008 |
| JP | 2010507286 A | 3/2010 |
| JP | 2010110004 A | 5/2010 |
| JP | 2011527553 A | 10/2011 |
| JP | 2013542666 A | 11/2013 |
| JP | 2014504098 A | 2/2014 |
| JP | 2015165726 A | 9/2015 |
| RU | 2358410 C2 | 6/2009 |
| RU | 2008106939 A | 8/2009 |
| RU | 2521081 C2 | 6/2014 |
| WO | 2012109528 A1 | 8/2012 |
| WO | 2013058876 A1 | 4/2013 |
| WO | 2013147495 A1 | 10/2013 |
| WO | 2014158050 A1 | 10/2014 |

OTHER PUBLICATIONS

Sychev et al, "Inter-layer prediction modes based on base layer sharpness filter," Joint Collaborative Team on Video coding (JCT-VC) of ITU-T SG 16 WP 3 and ISO/IEC JTC 1/SC 29/WG 11, JCTVC-N0070, 14th meeting: Vienna, Austria, International Telecommunication Union, Geneva, Switzerland (Jul. 25-Aug. 2, 2013).

Sajjab et al., "Digital image super-resolution using adaptive interpolation based on Gaussian function," Multimedia Tools and Applications, vol. 74, No. 20, XP035547508, Kluwer Academics Publishers, Boston, USA (Jul. 9, 2013).

Turkowski, Filters for Common Resampling Tasks, XP002592040, pp. 1-14 (Apr. 10, 1990).

Series H: Audiovisual and Multimedia Systems; Infrastructure of audiovisual services—Coding for moving video; Advanced video coding for generic audiovisual services, Recommendation ITU-T H.264, pp. i-768, International Telecommunication Union, Geneva, Switzerland (Feb. 2014).

"Line Transmission of Non-Telephone Signals; Video Codec for Audiovisual Services at p × 64 kbits," ITU-T Recommendation H.261, pp. i-25, International Telecommunication Union, Geneva, Switzerland (Mar. 1993).

"Series H: Audiovisual and Multimedia Systems; Infrastructure of audiovisual services—Coding of moving video; Video coding for low bit rate communication," ITU-T Recommendation H.263, pp. i-216, International Telecommunication Union, Geneva, Switzerland (Jan. 2005).

"Series H: Audiovisual and Multimedia Systems; Infrastructure of audiovisual services—Coding of moving video; High efficiency video coding," Recommendation ITU-T H.265, pp. i-612, International Telecommunication Union, Geneva, Switzerland (Apr. 2015).

Ikeda et al., "TE12.2: Results on MC interpolation filters," Joint Collaborative Team on Video Coding (JCT-VC) of ITU-T SG16 WP3 and ISO/IEC JTC1/SC29/WG11, JCTVC-C162, 3rd Meeting, Guangzhou, China, International Telecommunication Union, Geneva, Switzerland (Oct. 7-14, 2010).

Wedi, "Adaptive Interpolation Filter for Motion Compensated Prediction," IEEE International Conference on Image Processing, Institute of Electrical and Electronics Engineers, New York, New York (2002).

Vatis et al., "Motion-and Aliasing-Compensated Prediction Using a Two-Dimensional Non-Separable Adaptive Wiener Interpolation Filter," IEEE International Conference on Image Processing, Institute of Electrical and Electronics Engineers, New York, New York (2005).

Rusanovskyy et al., "Video Coding with Low-Complexity Directional Adaptive Interpolation Filters," IEEE Transactions on Circuits and Systems for Video Technology, vol. 19, No. 8, pp. 1239-1243, Institute of Electrical and Electronics Engineers, New York, New York (Aug. 2009).

Dong et al., "Parametric Interpolation Filter for HD Video Coding," IEEE Transactions on Circuits and Systems for Video Technology, vol. 20, No. 12, pp. 1892-1897, Institute of Electrical and Electronics Engineers, New York, New York (Dec. 2010).

Matsuo et al., "Enhanced Region-Based Adaptive Interpolation Filter," 28th Picture coding Symposium, Nagoya, Japan, PCS2010, pp. 526-529, Institute of Electrical and Electronics Engineers, New York, New York (Dec. 8-10, 2010).

(56) References Cited

OTHER PUBLICATIONS

Ugar et al., "Motion Compensated Prediction and Interpolation Filter Design in H.265/HEVC," IEEE Journal of Selected Topics in Signal Processing, vol. 7, No. 6, pp. 946-956, Institute of Electrical and Electronics Engineers, New York, New York (Dec. 2013).
Liu et al., "Motion Blur Compensation in HEVC Using Fixed-Length Adaptive Filter," IEEE Picture Coding Symposium (PCS), pp. 30-34, Institute of Electrical and Electronics Engineers, New York, New York (2015).
Liu, "Unified Loop Filter for Video Compression," IEEE Transactions on Circuits and Systems for Video Technology, vol. 20, No. 10, pp. 1378-1382, Institute of Electrical and Electronics Engineers, New York, New York (Oct. 2010).
Tsai et al., "Adaptive Loop Filtering for Video Coding," IEEE Journal of Selected Topics in Signal Processing, vol. 7, No. 6, pp. 934-945, Institute of Electrical and Electronics Engineers, New York, New York (Dec. 2013).
Chiu et al., "Adaptive (Wiener) Filter for Video Compression," ITU-T Study Group 16-Contribution 437, Document VCEG-Al14, COM 16-C 437 R1-E, pp. 1-7, International Telecommunication Union, Geneva, Switzerland (Apr. 2008).
Lu et al., "CE6.H related: Results on Modified Binarization for Region Boundary Chain Coding," Joint Collaborative Team on 3D Video Coding Extensions of ITU-T SG 16 WP 3 and ISO/IEC JTC 1/SC 29/WG 11, 4th Meeting: Incheon, KR, JCT3V-D0077, pp. 1-6, International Telecommunication Union, Geneva, Switzerland (Apr. 20-26, 2013).
Yoon et al.,"Adaptive Filtering for Prediction Signal in Video Compression," 2011 IEEE International Conference on Consumer Electronics—Berlin (ICCE-Berlin), XP031968553, Institute of Electrical and Electronics Engineers, New York, New York (2011).
Ma et al., "SCE4: Switchable De-ringing Filter for Inter-layer Prediction," Joint Collaborative Team on Video Coding (JCT-VC) of ITU-T SG 16 WP 3 and ISO/IEC JTC 1/SC 29/WG 11, 13th Meeting: Incheon, KR, JCTVC-M0055, International Telecommunication Union, Geneva, Switzerland (Apr. 18-26, 2013).
Laude et al., "Motion Blur Compensation in Scalable HEVC Hybrid Video Coding," PCS 2013, 2013 30th Picture Coding Symposium, IEEE, Institute of Electrical and Electronics Engineers, New York, New York (2013).
Ma et al., "De-Ringing Filter for Scalable Video Coding," 2013 IEEE International Conference on Multimedia and Expo Workshops (ICMEW), Institute of Electrical and Electronics Engineers, New York, New York (Jul. 2013).
Helle et al., "A Scalable Video Coding Extension of HEVC," 2013 Data Compression Conference, Institute of Electrical and Electronics Engineers, New York, New York (Mar. 2013).
Alshina et al., "Inter-layer Filtering for Scalable Extension of HEVC," 2013 IEEE, PCS 2013, 2013 30th Picture Coding Symposium, Institute of Electrical and Electronics Engineers, New York New York (2013).
Arad et al., "Enhancement by Image-Dependent Warping," IEEE Transactions on Image Processing, vol. 8, No. 8, pp. 1063-1074, Institute of Electrical and Electronic Engineers, New York, New York (Aug. 1999).
Prades-Nebot et al., "Image enhancement using warping technique," Electronics Letters, vol. 39 No. 1, pp. 32-33, Institute of Electrical and Electronic Engineers, New York, New York (2003).
Yoon et al., "Adaptive Prediction Block Filter for Video Coding," ETRI Journal, vol. 34, No., pp. 106-109 (Feb. 2012).
Maxim et al., "SCE3: Inter-layer prediction modes based on base layer sharpness filter," Joint Collaborative Team on Video Coding (JCT-VC) of ITU-T SG 16 WP 3 and ISO/IEC JTC 1/SC 29/WG 11, JCTVC-O0163, pp. 1-7, International Telecommunication Union, Geneva, Switzerland (Oct. 23-Nov. 1, 2013).
Murakami Atsumichi et al.,"High efficiency video coding technology HEVC / H.265 and its application," pp. 1-2, with English abstract (2012).
Zhang, "Video Image Enhancement Technology Based on Real-time Processing of FPGA," With English Abstract, North University of China, pp. 1-71, North University of China, Tayuan, China (May 2011).

\* cited by examiner

APPARATUS AND METHOD FOR VIDEO MOTION COMPENSATION WITH SELECTABLE INTERPOLATION FILTER

CROSS-REFERENCE TO RELATED APPLICATIONS

This application is a continuation of International Application No. PCT/RU2015/000614, filed on Sep. 25, 2015, the disclosure of which is hereby incorporated by reference in its entirety.

TECHNICAL FIELD

The present disclosure generally relates to the field of video processing and to an apparatus for video motion compensation, and specifically relates to a video coder and to a video decoder for supporting motion compensation to predict frames in a video. The present disclosure relates further to a method for coding and to a method for decoding a video stream using motion compensation. Finally, the present disclosure relates to a computer program having a program code for performing such a method.

BACKGROUND

In the field of video processing, and in particular in the field of hybrid video coding and compression, it is known to use inter and intra prediction as well as transform coding. Such hybrid video coding technologies are used in known video compression standards like H.261, H.263, MPEG-1, 2, 4, H.264/AVC or H.265/HEVC.

FIG. 1 shows a video coder according to the state of the art. The video coder 100 comprises an input for receiving input blocks of frames or pictures of a video stream and an output for generating an encoded video bit stream. The video coder 100 is adapted to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bit stream.

The video stream corresponds to a plurality of frames, wherein each frame is divided into blocks of a certain size that may be intra or inter coded by a prediction unit 108. The blocks of for example the first frame of the video stream are intra coded via the prediction unit 108. An intra frame is coded using only the information within the same frame, so that it can be independently decoded and it can provide an entry point in the bit stream for random access. Blocks of other frames of the video stream are inter coded via prediction unit 108: information from coded frames, which are called reconstructed reference frames, are used to reduce the temporal redundancy, so that inter coded block is predicted from a block of the same size in a reconstructed reference frame. The prediction unit 108 is adapted to select whether a block of a frame is to be intra or inter coded.

For performing inter prediction, the coded reference frames are processed by an inverse quantization unit 104, an inverse transform unit 105, then added to prediction block and processed by loop filtering unit 106 so as to obtain the reconstructed reference frames that are then stored in a frame buffer 107 to be used for temporal inter frame prediction.

The prediction unit 108 comprises as input a current frame or picture to be inter or intra coded and one or several reference frames or pictures from the frame buffer 107.

Motion estimation and motion compensation are applied by the prediction unit 108. The motion estimation is used to obtain a motion vector and a reference frame based on certain cost function. The motion compensation then describes a current block of the current frame in terms of the transformation of a reference block of the reference frame to the current frame. The prediction unit 108 outputs a prediction block for the current block, wherein said prediction block minimizes the difference between the current block to be coded and its prediction block, i.e. minimizes the residual block. The minimization of the residual block is based e.g. on a rate-distortion optimization procedure.

The difference between the current block and its prediction, i.e. the residual block, is then transformed by the transform unit 101. The transform coefficients are quantized and entropy coded by the quantization unit 102 and the entropy encoding unit 103. The thus generated encoded video bit stream comprises intra coded blocks and inter coded blocks.

Such a hybrid video coding comprises motion-compensated prediction combined with transform coding of the prediction error. For each block, the estimated motion vector is also transmitted as signalling data in the encoded video bit stream. Today's standards H.264/AVC and H.265/HEVC are based on ¼ pel displacement resolution for the motion vector. In order to estimate and compensate the fractional-pel displacements, the reference block has to be interpolated on the fractional-pel positions. An interpolation filter is used to obtain such an interpolated frame on the fractional-pel positions.

The quality of the interpolated block strongly depends on the properties of the used interpolation filter. Short-tap filters, e.g. bilinear filters, may suppress high frequencies and render the interpolated frame blurred. Other filters like long-tap filters may preserve high frequencies but generate some ringing artifacts in the neighbourhood of sharp edges. Another problem is that the motion compensation makes use of a previously encoded and reconstructed frame as a reference frame: the reference frame may contain artifacts caused by quantization of transform coefficient, which is referred to as Gibbs effect. Because of these artifacts, the edges as well as the area around the edges may also be distorted.

The reconstructed reference blocks and frames may also contain undesirable false edges generated by the video coder itself. Such artifacts may be caused by the separate and independent processing of each block. In this respect, the loop filtering unit 106 applies a de-blocking filtering that aims to mitigate these blocking artifacts, but the loop filtering unit 106 is only able to partially remove these artifacts. Other edge artifacts may be related to a gradient banding caused by a coarse quantization of smooth gradient regions. Consequently, the reference block and frame may contain undesirable edges.

The quality of motion prediction depends on several factors. The quality of the reconstructed reference block, the presence of artifacts and undesirable noises in the reference block strongly affects the quality of the motion prediction. Further on, the interpolation filter defines the quality of the interpolated edges, their blurring and the presence of ringing in the interpolated block. The content of prediction block also influences the quality of motion prediction since most of the artifacts appear near to edges.

Several techniques are known from the prior art to improve the motion compensated prediction. For instance, the video coding standard H.265/HEVC has been proposed with more sophisticated fixed linear interpolation filters that provide better interpolation quality than previous H.264/AVC standard. Also, an adaptive loop filtering (ALF) can be carried out in the loop filtering unit 106. Such a filtering introduces linear adaptive filter, usually Wiener-based, to minimize difference between the reconstructed and the original block. However such an in-loop filtering technique cannot remove artifacts caused by motion interpolation filter because in-loop filters are applied to the reference block before the motion interpolation.

An adaptive interpolation filters (AIF) is a known technique that tries to find a Wiener-based optimum interpolation filter for each fractional motion position by minimizing the difference between interpolated and original block. The found filter coefficients need then to be passed to the decoder. Such an adaptive filter is linear and is in the form of a matrix or vector of coefficients. Further on, each fractional motion vector position has its own optimal filter. The form of the adaptive filter and the need to transfer several filters for the fractional positions imply a significant signalling overhead for the adaptive interpolation filtering technique.

SUMMARY

Having recognized the above-mentioned disadvantages and problems, the present disclosure aims to improve the state of the art. In particular, an object of the present disclosure is to provide a video coder, a coding method, a video decoder, and a decoding method allowing for an improved coding and decoding of a video stream of subsequent frames.

The present disclosure, for example allows to improve the quality of the predictive coding. For example, the disclosure allows to remove artifacts caused by the motion compensation and, specifically, caused by the interpolation of the reference block on fractional-pel positions as well as to improve quality of prediction by reducing quantization artifacts of reference frame. It is a further object of the disclosure to keep the signalling overhead in the encoded video bit stream at a low level.

The disclosure provides implementations defined in the enclosed independent claims. Advantageous implementations of the present disclosure are further defined in the respective dependent claims.

A first aspect of the present disclosure provides a video coder for predictive coding a video stream of subsequent frames according to motion compensation into an encoded video bit stream. The video coder comprises a frame buffer configured to store at least one reference frame of the video stream. The video coder comprises a prediction unit configured to generate a prediction block of a current block of a current frame from a reference block of the reference frame according to a motion vector having fractional-pel resolution, said fractional-pel resolution defining an integer-pel position and fractional-pel positions. The prediction unit is configured to interpolate the reference block according to the fractional-pel resolution via one of the at least three following interpolation filters: a blurring interpolation filter, a tap filter, and the tap filter followed by a sharpening filter.

Thereby, the motion interpolation scheme of the prediction unit comprises the mentioned three interpolation filter types that are a blurring interpolation filter, a tap filter, and the tap filter followed by a sharpening filter. The prediction unit may then choose the filter type depending on the video content. These three filter types may be selected during the encoding process for different types of content.

In an implementation form of the video coder according to the first aspect, at least one of the blurring interpolation filter and the sharpening filter is an adaptive filter configured to be controlled by at least one adaptive parameter.

Thereby, the reference block may be interpolated by an interpolation filter that can be adapted to the specific content of the video. The adaptation can take account of local features of the video content and the required signalling overhead can be limited due to the use of a parametric representation of the interpolation filter with only one coefficient for adaptation and transmission.

In an implementation form of the video coder according to the first aspect, the sharpening filter is a non-linear filter.

Thereby, that usage of such a non-linear sharpening filter is preferable for motion prediction enhancement. Traditional edge enhancement techniques based on linear sharpening or de-blurring filters, like unsharp masking techniques, may increase subjective quality but cannot suppress the ringing artifacts caused by motion interpolation filtering. Also, such linear sharpening even may increase ringing and reduce the objective performance characteristics. On the other, the proposed non-linear sharpening filter can provide better results for ringing elimination and is thus advantageous. Also, the use of a non-linear design for the sharpening filter, e.g. for the adaptive sharpening filter, can advantageously reduce the number of adaptive parameters and thus the signalling overhead.

In an implementation form of the video coder according to the first aspect, the sharpening filter is configured to be controlled by a single adaptive parameter.

Thereby, the required signalling overhead can be further limited due to the use of only a single adaptive parameter for the sharpening filter. Particularly, the size of the blocks used for predictive coding can be reduced without at the same time increasing the signalling overhead.

In an implementation form of the video coder according to the first aspect, the adaptive sharpening filter comprises an edge map calculation unit adapted to generate an edge map of a source block, said source block being the reference block or the prediction block. The sharpening filter comprises a blurring filter adapted to blur the edge map of the source block. The sharpening filter comprises a high-pass filter adapted to generate, by high-pass filtering the blurred edge map, a derivative vector for each position of the source block. The sharpening filter comprises a scaling unit adapted to generate a displacement vector by scaling the derivative vector with a sharpening strength coefficient. The sharpening filter comprises a warping unit adapted to warp the prediction block based on the displacement vector.

Thereby, this structure of the sharpening filter defines a non-linear sharpening filter that advantageously can provide better results in terms of elimination of ringing artifacts.

In an implementation form of the video coder according to the first aspect, the adaptive parameter of the sharpening filter includes the sharpening strength coefficient.

Thereby, the use of the sharpening strength coefficient as adaptive parameter implies that only one adaptive parameter is required, which allows to further reduce the signalling overhead.

In an implementation form of the video coder according to the first aspect, the prediction unit is configured to select the sharpening strength coefficient that minimizes a residual block, said residual block being the difference between the current block and the prediction block outputted by the adaptive sharpening filter, or based on a cost criterion like for example a rate distortion optimization.

In an implementation form of the video coder according to the first aspect, the blurring interpolation filter is a low-pass filter that can not generate ringing due to nature of its design.

In an implementation form of the video coder according to the first aspect, the blurring interpolation filter comprises a single adaptive parameter.

Thereby, the required signalling overhead can be further limited due to the use of only a single adaptive parameter for the blurring interpolation filter.

In an implementation form of the video coder according to the first aspect, the adaptive parameter of the blurring interpolation filter includes a blurring coefficient.

Thereby, the use of the blurring coefficient as adaptive parameter implies that only one adaptive parameter is required, which allows to further reduce the signalling overhead.

In an implementation form of the video coder according to the first aspect, the blurring interpolation filter is a Gaussian filter or a bi-linear filter, and if the blurring interpolation filter is a Gaussian filter the blurring coefficient is the standard deviation of the Gaussian distribution.

Thereby, it is possible to suppress undesirable edges caused for instance by blocking and gradient banding in a reconstructed reference frame by applying blurring interpolation. Also, undesirable high frequency noises can be suppressed in a reconstructed reference frame.

In an implementation form of the video coder according to the first aspect, the blurring interpolation filter comprises a calculation unit configured to calculate Gaussian filter coefficients based on the standard deviation, and a filtering unit configured to generate, as an output of the blurring interpolation filter, a prediction block by using the calculated Gaussian filter coefficients.

In an implementation form of the video coder according to the first aspect, the video coder comprises a unit configured to store pre-calculated set of Gaussian filters coefficients based on different standard deviations, and a filtering unit configured to generate, as an output of the blurring interpolation filter, a prediction block by using one of the pre-calculated set of Gaussian filters.

Thereby, this pre-calculation has the effect that computational resources can be saved during an optimization procedure.

In an implementation form of the video coder according to the first aspect, the prediction unit is configured to select the blurring coefficient that minimizes a residual block, said residual block being the difference between the current block and the prediction block outputted by the blurring interpolation filter, or based on a cost criterion like, for example, a rate distortion optimization.

Thereby, the motion compensation can be further improved by choosing a blurring coefficient during an optimization procedure.

In an implementation form of the video coder according to the first aspect, the tap filter is a fixed long tap filter with sharp step response.

In an implementation form of the video coder according to the first aspect, the integer-pel position and each of the fractional-pel positions are associated with said one of the at least three interpolation filters and/or, if present, with given value of the adaptive parameter of the sharpening filter and/or of the blurring interpolation filter.

Thereby, since a pel position is associated with one of the three interpolation filters and possibly with a respective adaptive parameter, the signalling overhead can be reduced due to the usage of fractional motion vector positions as signalling points for interpolation filter type and adaptive parameters.

In an implementation form of the video coder according to the first aspect, the video coder comprises an encoding unit configured to generate the encoded video bit stream, and to specify, as signalling information in the encoded video bit stream, interpolation filter type and said given value of the adaptive parameter and the associated integer-pel position or fractional-pel position.

Thereby, the amount of signalling information that has to be transmitted to the decoder can be reduced, and the signalling overhead can be reduced.

In an implementation form of the video coder according to the first aspect, the choice of the interpolation filter among the three interpolation filters depends on the integer-pel position or the fractional-pel position, so that a given integer-pel position or fractional-pel position implies the choice of a given interpolation filter and choice of adaptive parameters if any.

Thereby, it is possible to perform adaptation to local features without introducing additional signalling overhead.

In an implementation form of the video coder according to the first aspect, the video coder comprises at least one interpolation filter pattern defining, for each one of the integer-pel position and of the fractional-pel positions, the associated interpolation filter type and/or, if present, the value of the adaptive parameter.

Thereby, the interpolation filter pattern can easily define each the interpolation filter type and if applicable the adaptive parameter value without introducing additional signalling overhead.

Thereby, the decoder is able to choose the interpolation filter defined in the interpolation filter pattern depending on the pel position.

In an implementation form of the video coder according to the first aspect, the video coder comprises a plurality of interpolation filter patterns, wherein the prediction unit is configured to select one of the plurality of interpolation filter patterns.

Thereby, a plurality of interpolation filter patterns can for example be calculated and prepared beforehand, such that during coding a video stream it is only necessary to chose one of the interpolation filter patterns.

In an implementation form of the video coder according to the first aspect, the video coder comprises an encoding unit configured to generate the encoded video bit stream and to add, as signalling information in the encoded video bit stream, said interpolation filter pattern(s).

In an implementation form of the video coder according to the first aspect, in case a plurality of interpolation filter patterns is provided, the encoding unit is configured to add, as signalling information in the encoded video bit stream, selection information about the interpolation filter pattern to be selected.

Thereby, this selection information or index information can indicate the interpolation filter pattern that should be selected by the decoder. In case the decoder already knows the plurality of interpolation filter patterns, this selection information therefore further reduces the signalling overhead.

In an implementation form of the video coder according to the first aspect, the encoding unit is configured to add the signalling information about the interpolation filter pattern to be selected for each prediction block, for an arbitrary or regular region of the frame, at a frame level, at a GOP (group of pictures) level, at a PPS (picture parameter set) level or at an SPS (sequence parameter set) level.

Thereby, it is possible to set the interpolation filter information to a desired granularity so that the signalling can be optimized.

A second aspect of the present disclosure provides a method for predictive coding a video stream of subsequent frames according to motion compensation into an encoded video bit stream. The method comprises storing at least one reference frame of the video stream. The method comprises a prediction step comprising generating a prediction block of a current block of a current frame from a reference block of the reference frame according to a motion vector having fractional-pel resolution, said fractional-pel resolution defining an integer-pel position and fractional-pel positions. The prediction step further comprises interpolating the reference block according to the fractional-pel resolution via one of the at least following three interpolation filters: a blurring interpolation filter, a tap filter, and the tap filter followed by a sharpening filter.

Further features or implementations of the method according to the second aspect of the disclosure can perform the functionality of the video coder according to the first aspect of the disclosure and its different implementation forms.

A third aspect of the present disclosure provides a video decoder for decoding an encoded video bit stream obtained by predictive coding a video stream of subsequent frames according to motion compensation. The video decoder comprises a frame buffer configured to store at least one reference frame obtained from the encoded video bit stream. The video decoder comprises a prediction unit configured to generate a prediction block of a current block of a current frame from a reference block of the reference frame according to a motion vector having fractional-pel resolution, said fractional-pel resolution defining an integer-pel position and fractional-pel positions. The prediction unit is configured to interpolate the reference block according to the fractional-pel resolution via one of the at least three following interpolation filters: a blurring interpolation filter, a tap filter, and the tap filter followed by a sharpening filter.

Thereby, the advantages obtained with respect to the video coder according to the first aspect are also given with respect to the video decoder according to the third aspect.

In an implementation form of the video decoder according to the third aspect, at least one of the blurring interpolation filter and the sharpening filter is an adaptive filter configured to be controlled by at least one adaptive parameter, Thereby, the reference block may be interpolated by an interpolation filter that can be adapted to the specific content of the video. The adaptation can take account of local features of the video content and the required signalling overhead can be limited due to the use of a parametric representation of the interpolation filter with only one coefficient for adaptation and transmission.

In an implementation form of the video decoder according to the third aspect, the choice of the interpolation filter among the three interpolation filters depends on the integer-pel position or the fractional-pel position, so that a given integer-pel position or fractional-pel position implies the choice of a given interpolation filter and/or, if present, the value of the adaptive parameter.

Thereby, the usage of fractional motion vector positions as signalling points for interpolation filter type and adaptive parameters does not generate additional signalling overhead.

In an implementation form of the video decoder according to the third aspect, the prediction unit is configured to choose the one of the three interpolation filters according to an interpolation filter pattern. Said interpolation filter pattern defines, for an integer position of the motion vector and its associated fractional positions, the associated interpolation filter type and/or, if present, the value of the adaptive parameter.

Thereby, the interpolation filter pattern can easily define each the interpolation filter type and if applicable the adaptive parameter value, so that the signalling overhead can be further reduced.

In an implementation form of the video decoder according to the third aspect, the video decoder comprises a decoding unit configured to obtain from the encoded video bit stream, as signalling information, the interpolation filter pattern.

In an implementation form of the video decoder according to the third aspect, the video decoder comprises a decoding unit configured to obtain from the encoded video bit stream, as signalling information, a plurality of interpolation filter patterns as well as selection information about the interpolation filter pattern to be selected. The prediction unit is configured to select one of the obtained interpolation filter patterns according to the obtained selection information, and to choose the one of the three interpolation filters according to the selected interpolation filter pattern.

Thereby, this selection information or index information can indicate the interpolation filter pattern that should be selected by the decoder. Once the decoder knows the plurality of interpolation filter patterns, it is only necessary to transmit this selection information via the encoded video bit stream, such that the signalling overhead can be further reduced.

In an implementation form of the video decoder according to the third aspect, the prediction unit is configured to pre-store a plurality of interpolation filter patterns before the video decoder receives the encoded video bit stream. The video decoder comprises a decoding unit configured to obtain from the encoded video bit stream, as signalling information, selection information about the pre-stored interpolation filter pattern to be selected. The prediction unit is configured to select one of the pre-stored interpolation filter patterns according to the obtained selection information, and to choose the one of the three interpolation filters according to the selected interpolation filter pattern.

Thereby, the decoder already knows the plurality of interpolation filter patterns and it is only necessary to transmit, via the encoded video bit stream, this selection information. The signalling overhead can then be further reduced.

In an implementation form of the video decoder according to the third aspect, the decoding unit is configured to obtain the signalling information about the interpolation filter pattern to be selected for each prediction block, for an arbitrary or regular region of the frame, at a frame level, at a GOP (group of pictures) level, at a PPS (picture parameter set) level or at an SPS (sequence parameter set) level.

Thereby, it is possible to set the interpolation filter information to a desired granularity so that the signalling can be optimized.

Further features or implementations of the video coder according to the first aspect of the disclosure, particularly regarding the at least three interpolation filters and their structure, are also applicable to the video decoder according to the third aspect of the disclosure.

A fourth aspect of the present disclosure provides a method for decoding an encoded video bit stream obtained by predictive coding a video stream of subsequent frames according to motion compensation. The method comprises storing at least one reference frame obtained from the encoded video bit stream. The method comprises a prediction step comprising generating a prediction block of a current block of a current frame from a reference block of the reference frame according to a motion vector having fractional-pel resolution, said fractional-pel resolution defining an integer-pel position and fractional-pel positions. The prediction step further comprises interpolating the reference block according to the fractional-pel resolution via one of the at least following three interpolation filters: a blurring interpolation filter, a tap filter, and the tap filter followed by a sharpening filter.

Further features or implementations of the method according to the fourth aspect of the disclosure can perform the functionality of the video decoder according to the third aspect of the disclosure and its different implementation forms.

A fifth aspect of the present disclosure provides a computer program having a program code for performing such a coding and/or decoding method when the computer program runs on a computing device.

The disclosure proposes a motion compensation consisting in applying an improved motion interpolation filtering scheme including blurring, conventional and sharpening interpolation that may be adaptively adjusted according to local image features. The motion interpolation scheme comprises three different filter types—blurring, fixed and sharpening filters—that may be selected during encoding process. Blurring and sharpening filter may be adaptive for better fitting to local features of coding picture. In order to signal the interpolation filter type and the adaptive parameters to the decoder, it is proposed to use the fractional motion vector positions.

With the proposed interpolation filtering scheme, it is possible to perform adaptation to local features of coding picture by applying three filter types. A reduced signalling overhead can be achieved due to a parametric representation of the adaptive filters with only one coefficient for adaptation, which reduces the signalling overhead and allows for an adaptation to smaller regions of coding picture. The signalling overhead can be further reduced due to the usage of fractional motion vector positions as signalling points for interpolation filter type and adaptive parameters. An adaptation can be performed to local features of small regions of coding picture due to reduced signalling overhead. The ringing artifacts and blurring of edges caused by the motion interpolation filter can be reduced while keeping the quality of interpolated edges. It is also possible to reduce the ringing artifacts and blurring of edges caused by quantization of transform coefficient in reference picture. The blurring of edges caused by motion blur can also be reduced. The proposed scheme can suppress undesirable edges caused for instance by blocking and gradient banding in reconstructed reference picture by applying blurring interpolation, and suppress undesirable high frequency noises in reconstructed reference picture by applying blurring interpolation. The proposed scheme also increases the subjective quality of edges in reconstructed pictures, and increases the subjective quality of blurred and smooth gradient regions. The proposed interpolation filtering performs the job that loop or in-loop reference filtering does, and at the same time reduces artifacts caused by conventional motion interpolation filters adaptively to the image content.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which.

DETAILED DESCRIPTION OF EMBODIMENTS

Figure 2:
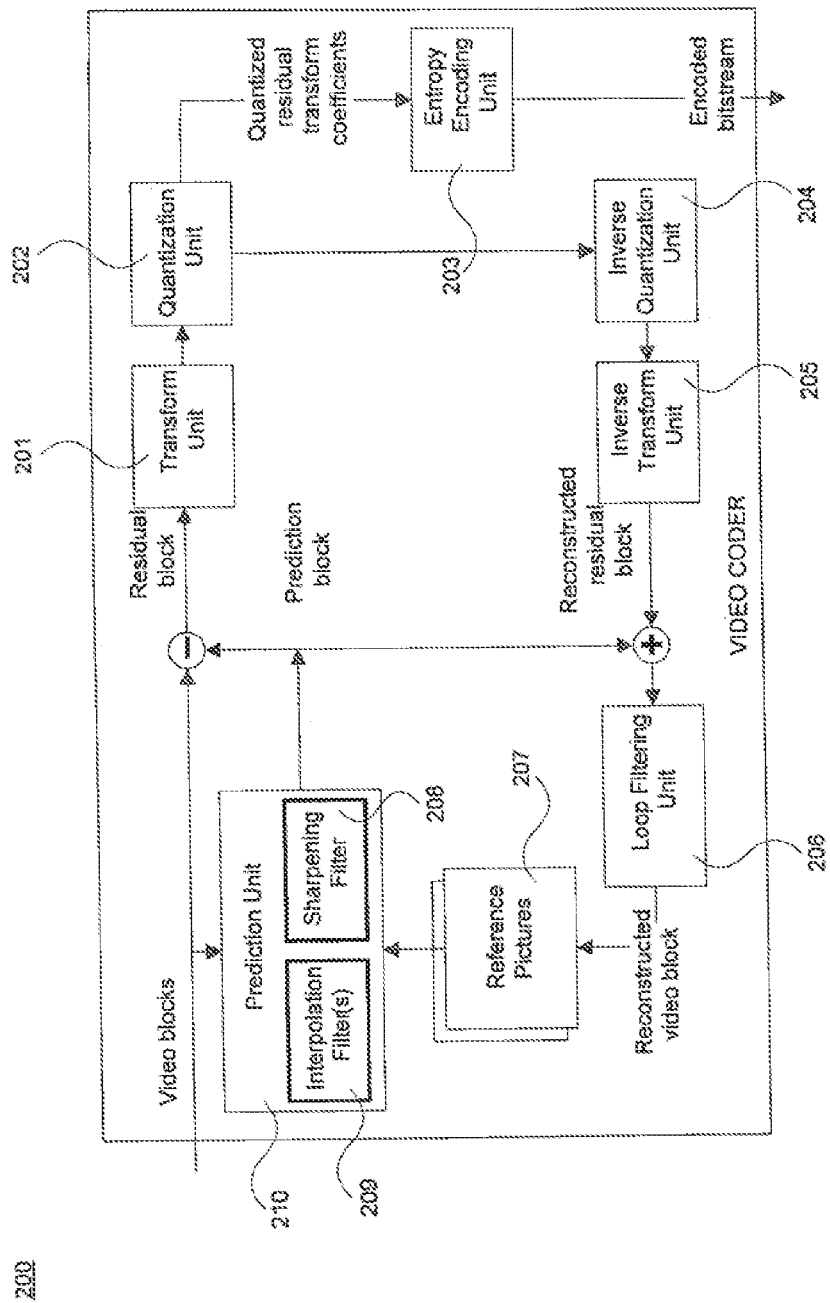
FIG. 2 shows a video coder according to an embodiment of the present disclosure.
Figure 3:
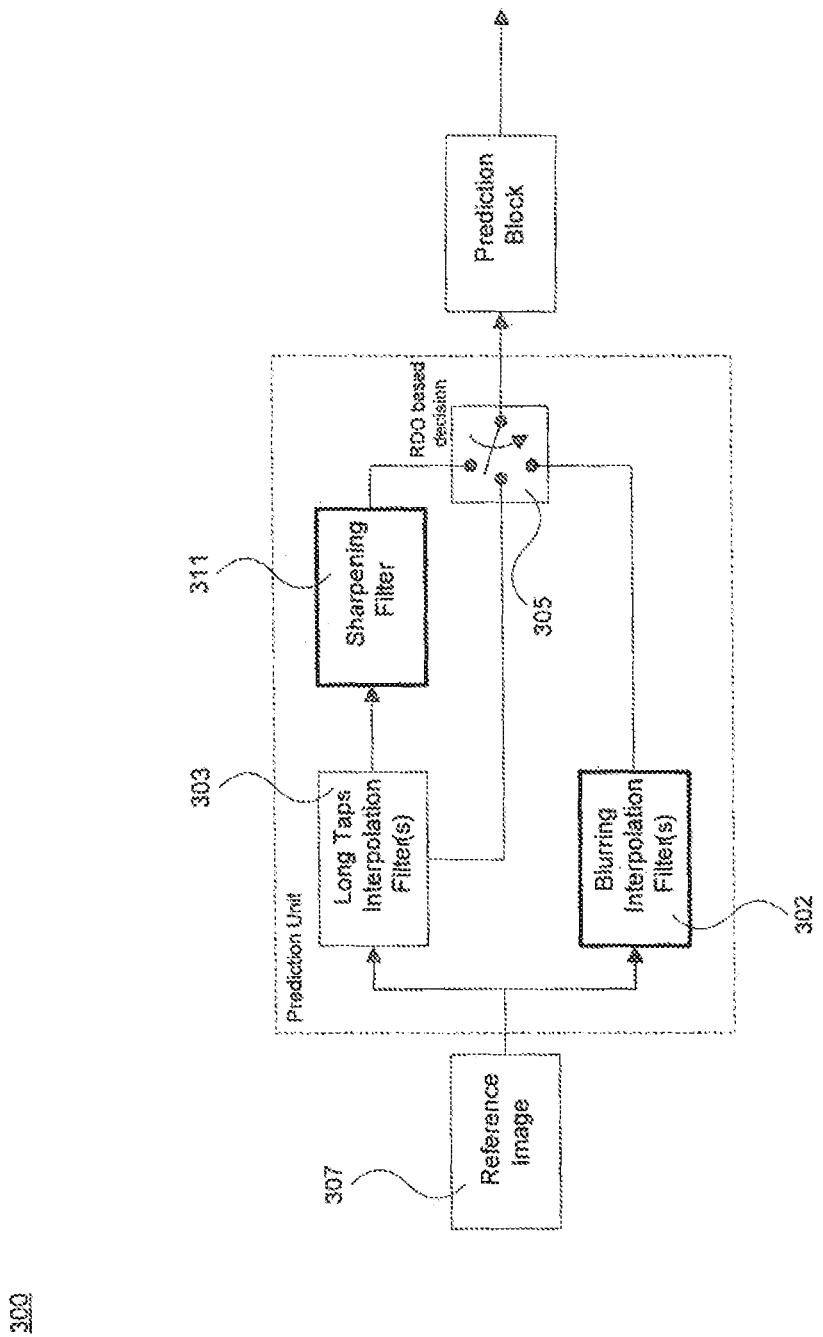
FIG. 3 shows interpolation filters of a video coder according to an embodiment of the present disclosure.

FIG. 2 shows a video coder according to an embodiment of the present disclosure, and particularly a video coder 200 for predictive coding a video stream of subsequent frames according to motion compensation into an encoded video bit stream. Further on, FIG. 3 shows interpolation filters of a video coder according to an embodiment of the present disclosure, The video coder 200 comprises particularly a frame buffer 207 and a prediction unit.

The frame buffer 207 is configured to store at least one reference frame or picture of the video stream. The prediction unit 210 is configured to generate a prediction block of a current block of a current frame from a reference block of the reference frame according to a motion vector having fractional-pel resolution. Said fractional-pel resolution defines an integer-pel position and fractional-pel positions.

Further on, the prediction unit 210 is configured to interpolate the reference block according to the fractional-pel resolution via one of the at least three following interpolation filters:

a blurring interpolation filter 302, a tap filter 303, and the tap filter 303 followed by a sharpening filter 311.

The sharpening filter 311 shown in FIG. 3 is referred to in FIG. 2 by the reference 208. The blurring interpolation filter 302 and tap filter 303 of FIG. 3 are represented in FIG. 2 by an interpolation filter(s) block 209.

Said reference frame may be different from a current frame of the video stream. Particularly and in the context of the disclosure, the current frame is a frame of the video stream that is currently encoded, while the reference frame is a frame of the video stream that has already been encoded and then reconstructed. In the followings, any reference to the feature "frame" may be replaced by a reference to the feature "picture".

The current frame may be encoded using an inter coding technique, i.e. the current frame is predicted from the at least one reference frame that is distinct from the current frame. The reference frame can be a previous frame, i.e. a frame that is located prior to the current frame within the video stream of subsequent frames. Alternatively if forward prediction is used, the reference frame can be a future frame, i.e. a frame that is located after the current frame. In case of a plurality of reference frames, at least one can be such a previous frame and at least one of them can be such a future frame. A reference frame can be intra coded, i.e. can be coded without using any further frame and without any dependence on other frames, so that it can be independently decoded and it can serve as entry point for random video access.

Particularly, the prediction unit 210 is adapted to perform motion estimation by generating a motion vector and estimating motion between the reference block of the reference frame and the current block of the current frame. Said motion estimation is performed during encoding to find the motion vector pointing to the best reference block in the reference frame based on certain cost function being, for example, the rate-distortion optimization. Beside the motion estimation, the prediction unit 210 is further adapted to perform motion compensation by generating the prediction block for the current block on the basis of the motion vector and the reference block.

Particularly, the motion prediction comprises motion estimation and motion compensation. The motion vector is generated by using a motion estimation unit. The reference block and the current block are preferably a respective area or sub-area of the reference frame and the current frame. Such a block may have a regular shape, like e.g. a rectangular shape, or an irregular shape. Alternatively, the blocks can have the same size as the frames. Both the current block and the reference block have the same size. The size of the blocks can be defined via block mode information transmitted as side information or signalling data to the decoder. A block can correspond to a coding unit that is a basic coding structure of the video sequence of a pre-defined size, containing a part of a frame, e.g. 64×64 pixels.

The prediction block is generated for the current block in view of the reference block. Particularly, a plurality of prediction blocks can be generated for a plurality of current blocks of the current frame in view of a plurality of reference blocks. These reference blocks can be part of a single reference frame or can be selected from different reference frames. Several prediction blocks can be generated for the current frame, and the prediction blocks generated for the current frame can be combined to obtain a prediction frame of the current frame.

Figure 1:
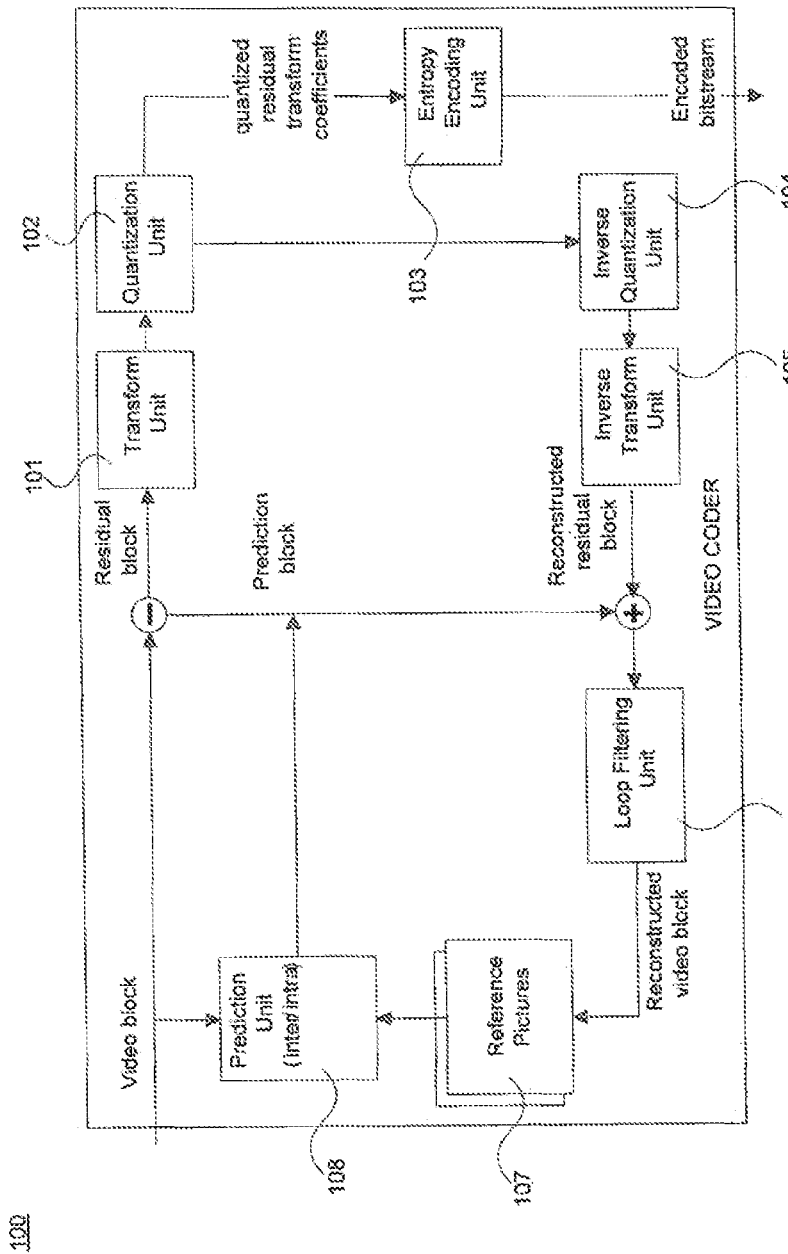
FIG. 1 shows a video coder according to the state of the art.

The video coder 200 of FIG. 2 comprises further units similar to the video coder 100 of FIG. 1 for particularly supporting hybrid video coding. For example, the video coder 200 comprises similar units that are a transform unit 201, a quantization unit 202 and the entropy encoder or entropy encoding unit 203 for, as already known in the art, generating transform coefficients via a transformation into the frequency domain, quantizing the coefficients and entropy coding the quantized coefficients for example together with signalling data. The input of the transform unit 201 is a residual block defined as the difference between the current block of the current frame, referred to as video block in FIG. 2, and the prediction block outputted by the prediction unit 210. The entropy encoding unit 203 is adapted to generate as an output the encoded video bit stream.

The video coder 200 comprises further similar units that are an inverse quantization unit 204, an inverse transform unit 205 and a loop filtering unit 206. The quantized transform coefficients generated by the quantization unit 202 are inverse quantized and inverse transformed by respectively the inverse quantization unit 204 and inverse transform unit 205 to obtain a reconstructed residual block corresponding to the residual block fed to the transform unit 201. The reconstructed residual block is then added to the prediction block previously used for generating the residual block, so as to obtain a reconstructed current block corresponding to the current block, this reconstructed current block being referred to as reconstructed video block in FIG. 2. The reconstructed current block may be processed by the loop filtering unit 206 to smooth out artifacts that are introduced by the block-wise processing and quantization. The current frame, which comprises at least one current block or advantageously a plurality of current blocks, can then be reconstructed from the reconstructed current block(s). This reconstructed current frame can be stored in the frame buffer 207 for serving as reference frame for inter prediction of another frame of the video stream.

The motion interpolation scheme proposed by the present disclosure is placed in the prediction unit 210 and is used for motion estimation and motion compensation to get frame blocks in fractional and integer pixel positions. As shown in FIG. 3, the interpolation scheme is based on the following three interpolation filter types:

- a blurring interpolation filter 302 that advantageously does not generate ringing, like for example a Gaussian or bi-linear filter,
- a tap filter 303, like a conventional long tap filter with sharp step response that in general may generate ringing, for example discrete cosine transform-based interpolation filter (DCT-IF) from H.265/HEVC,
- a combination of the tap filter 303 followed by a sharpening filter 311, like a combination of said conventional long tap filter with sharp step response and a non-linear sharpening filter that reduces ringing and increases sharpness of edges.

The prediction unit 210, 300 is configured to interpolate the reference block stored in the frame buffer 207, 307 according to the fractional-pel resolution via one of the at least three interpolation filters.

During motion estimation one of these three interpolation types can be chosen e.g. by a decision unit 305 carrying out a minimum prediction error or by minimum of cost (rate/distortion) criterion.

Figure 4:
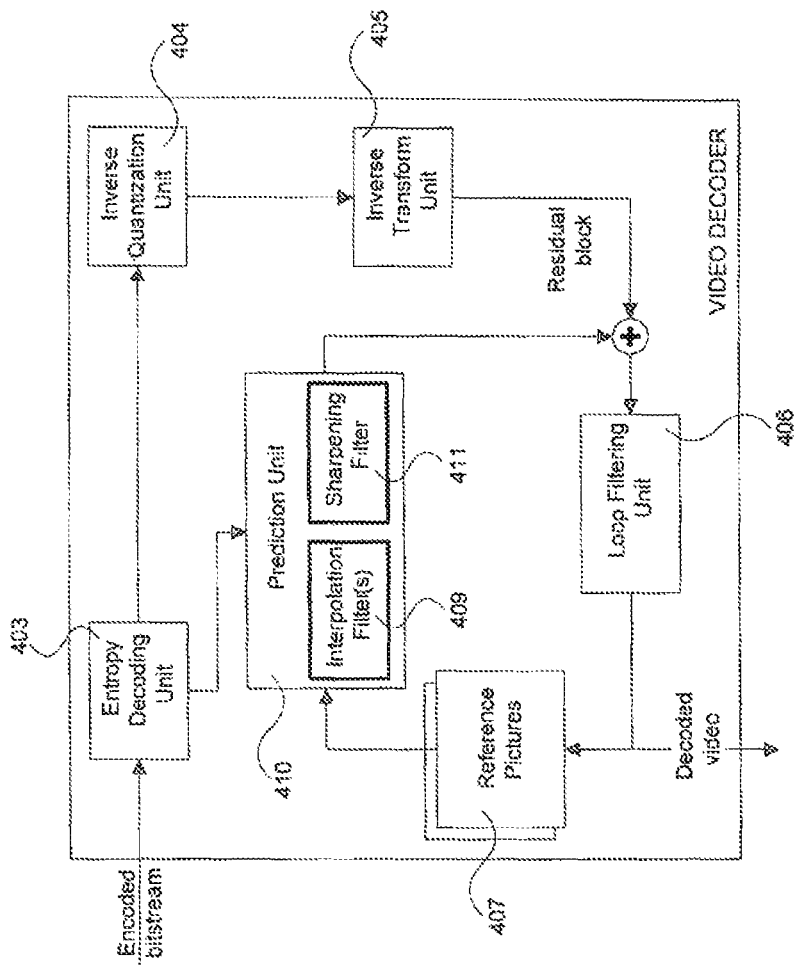
FIG. 4 shows a video decoder according to an embodiment of the present disclosure.

FIG. 4 shows a video decoder according to an embodiment of the present disclosure, and particularly a video decoder 400 for decoding an encoded video bit stream obtained by predictive coding a video stream of subsequent frames according to motion compensation.

The video decoder 400 comprises particularly a frame buffer 407 and a prediction unit 410. The frame buffer 407 is configured to store at least one reference frame obtained from the encoded video bit stream. The prediction unit 410 is configured to generate a prediction block of a current block of a current frame from a reference block of the reference frame according to a motion vector having fractional-pel resolution, said fractional-pel resolution defining an integer-pel position and fractional-pel positions. The prediction unit 410 is configured to interpolate the reference block according to the fractional-pel resolution via one of the at least three following interpolation filters:
- a blurring interpolation filter 302,
- a tap filter 303, and
- the tap filter 303 followed by a sharpening filter 311.

The decoder 400 is adapted to decode the encoded video bit stream generated by the video coder 300, and both the decoder 400 and the coder 300 generate identical predictions. The sharpening filter 311 shown in FIG. 3 is referred to in FIG. 4 by the reference 411. The blurring interpolation filter 302 and tap filter 303 of FIG. 3 are represented in FIG. 2 by an interpolation filter(s) block 409.

Particularly, the video decoder 400 may comprise further units that are also present in the video coder 200 like e.g. an inverse quantization unit 404, an inverse transform unit 405, and a loop filtering unit 406, which respectively correspond to the inverse quantization unit 204, the inverse transform unit 205, and the loop filtering unit 206 of the video coder 200. An entropy decoding unit 403 is adapted to decode the received encoded video bit stream and to correspondingly obtain quantized residual transform coefficients and, if present, signalling information. The quantized residual transform coefficients are fed to the inverse quantization unit 404 and the inverse transform unit 405 to generate a residual block. The residual block is added to a prediction block and the addition is fed to the loop filtering unit 406 to obtain the decoded video. Frames of the decoded video can be stored in the frame buffer 407 and serve as a reference frame for inter prediction.

The video coder 200 and the video decoder 400 comprises similar interpolation filters that are the blurring interpolation filter 302, the tap filter 303, and a combination of the tap filter 303 and the sharpening filter 311. Advantageously, at least one of the blurring interpolation filter 302 and the sharpening filter 311 is an adaptive filter configured to be controlled by at least one adaptive parameter.

For ensuring identical predictions on the coder side and on the decoder side, the integer-pel position and each of the fractional-pel positions are associated with said one of the at least three interpolation filters 302, 303, 303+311 and/or, if present, with given value of the adaptive parameter of the sharpening filter 311 and/or of the blurring interpolation filter 302.

For the coder 200 and the decoder 400, the choice of the interpolation filter among the three interpolation filters depends on the integer-pel position or the fractional-pel position, so that a given integer-pel position or fractional-pel position implies the choice of a given interpolation filter and choice of adaptive parameters if any.

On the video coder 200 side, the choice of the interpolation filter among the three interpolation filters depends on the integer-pel position or the fractional-pel position defined by the motion vector obtained during motion estimation. The encoding unit 203 of the coder 200 is configured to generate the encoded video bit stream, and to specify, as signalling information in the encoded video bit stream, the interpolation filter type and if present said given value of the adaptive parameter, as well as the associated integer-pel position or fractional-pel position. Moreover, the encoding unit 203 specifies, as signalling information in the encoded video bit stream, said motion vector.

The video decoder 400 is configured to obtain this signalling information from the encoded video bit stream. The decoder 400 receives the interpolation filter type and the associated pel position, and particularly receives for each pel position the associated interpolation filter type. If present, the decoder 400 also receives said given value of the adaptive parameter for each pel position. Moreover, the video decoder 400 is configured to obtain, as signalling information in the encoded video bit stream, the motion vector determined by the coder 200 during motion estimation. Thus, using the obtained motion vector, the decoder 400 is able to deduce the pel position and the associated interpolation filter type and, if present, the associated adaptive parameter value. Therefore, identical predictions can be carried out on the coder and decoder side while reducing the signalling overhead.

Figure 5:
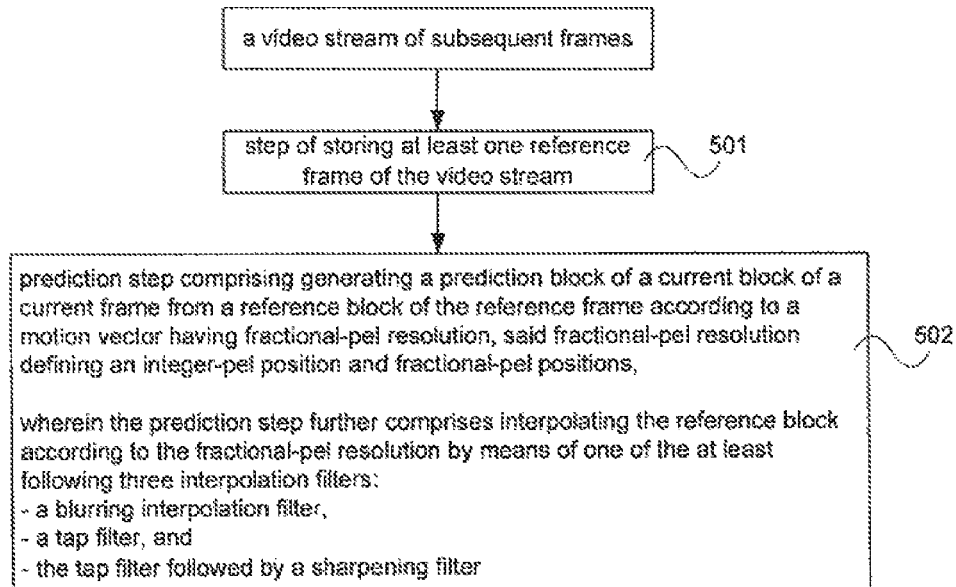
FIG. 5 shows a video coding method according to an embodiment of the present disclosure.

FIG. 5 shows a video coding method according to an embodiment of the present disclosure, and particularly a method for predictive coding a video stream of subsequent frames according to motion compensation into an encoded video bit stream.

The method comprises a step 501 of storing at least one reference frame of the video stream.

The method further on comprises a prediction step 502 comprising generating a prediction block of a current block of a current frame from a reference block of the reference frame according to a motion vector having fractional-pel resolution. Said fractional-pel resolution defines an integer-pel position and fractional-pel positions. Moreover, the prediction step comprises interpolating the reference block according to the fractional-pel resolution via one of the at least following three interpolation filters:
- a blurring interpolation filter,
- a tap filter, and
- the tap filter followed by a sharpening filter.

Figure 6:
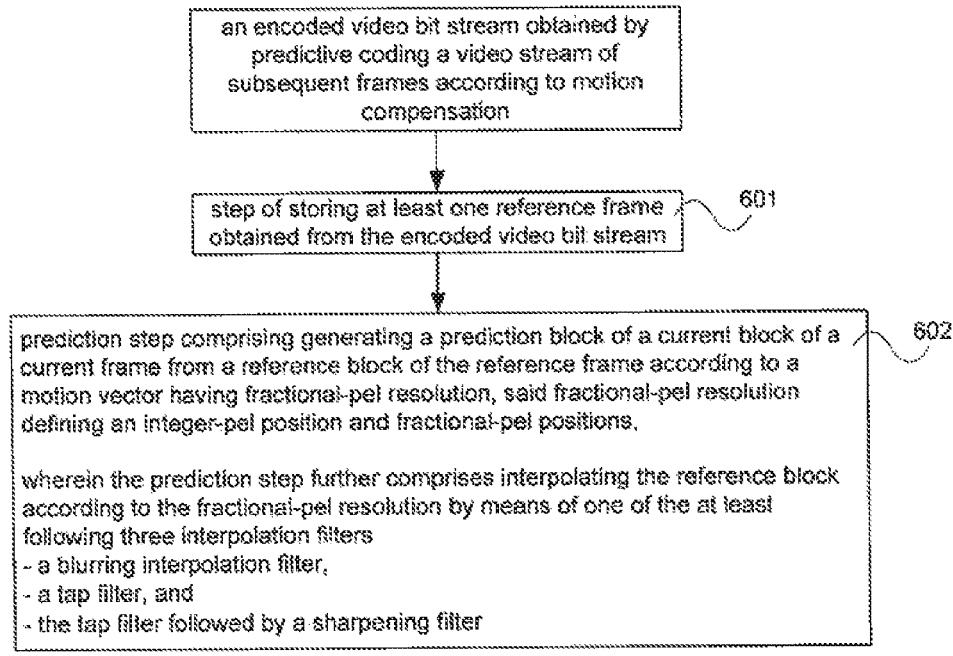
FIG. 6 shows a video decoding method according to an embodiment of the present disclosure.

FIG. 6 shows a video decoding method according to an embodiment of the present disclosure, and particularly a method for decoding an encoded video bit stream obtained by predictive coding a video stream of subsequent frames according to motion compensation.

The method comprises a step of storing 601 at least one reference frame obtained from the encoded video bit stream.

The method further on comprises a prediction step 602 comprising generating a prediction block of a current block of a current frame from a reference block of the reference frame according to a motion vector having fractional-pel resolution. Said fractional-pel resolution defines an integer-pel position and fractional-pel positions. The prediction step further comprises interpolating the reference block according to the fractional-pel resolution via one of the at least following three interpolation filters:
- a blurring interpolation filter,
- a tap filter, and
- the tap filter followed by a sharpening filter.

Further aspects and features described with respect to the video coder 200 or the video decoder 400 are also applicable to the coding method and the decoding method.

Figure 7:
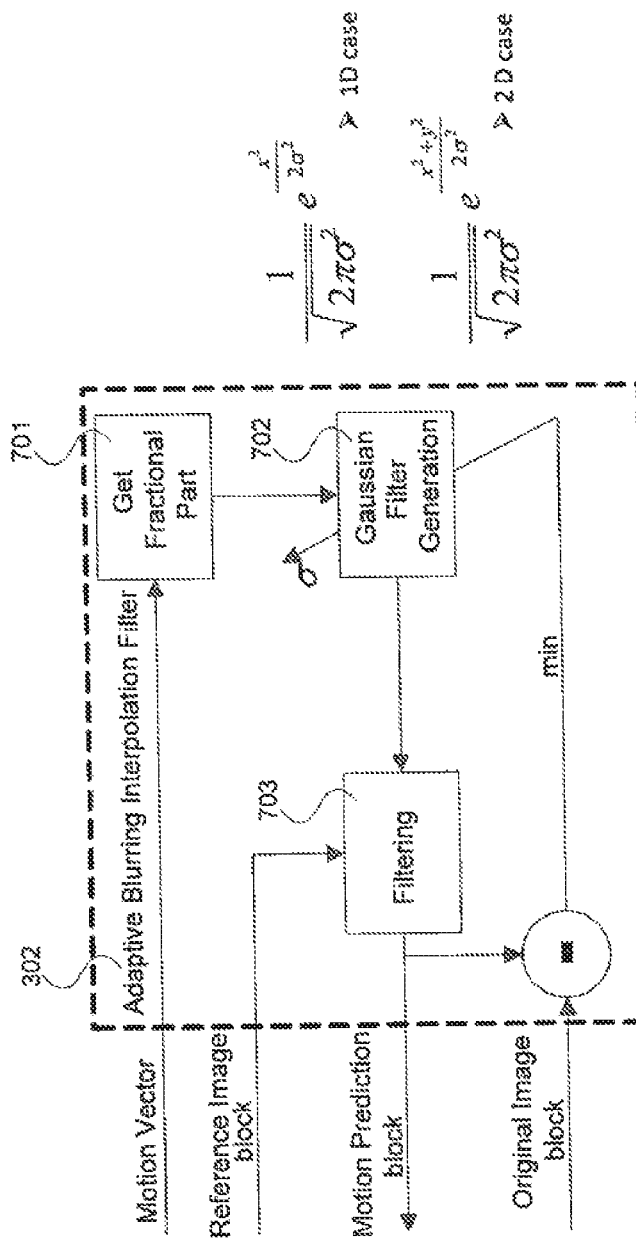
FIG. 7 shows an embodiment of a blurring interpolation filter according to the present disclosure.

FIG. 7 shows an embodiment of a blurring interpolation filter according to the present disclosure, and particularly an embodiment of the blurring interpolation filter 302 of the video coder 200.

In the embodiment of FIG. 7, the blurring interpolation filter 302 is implemented as a Gaussian filter in parametric form. The amount of blurring can be controlled just by one adaptive parameter σ of the Gaussian filter. This single adaptive parameter has the advantage that the filter can be easily optimized and that the signalling overhead for transferring the adaptive blurring parameter can be reduced.

The blurring interpolation filter 302 receives as an input the motion vector. The motion vector is determined by the coder 200 during motion estimation. Based on the motion vector, a unit 701 is configured to get the fractional part of the pel position of said motion vector.

A further unit 702 is configured to calculate the Gaussian filter coefficients with a given parameter σ and to obtain a fractional shift. A unit 703 is configured to obtain a motion prediction block, using as inputs the reference block and the interpolation filter coefficients calculated by the unit 702. Then, the blurring interpolation filter 302 is configured to calculate a prediction efficiency via prediction error or cost criterion. The prediction error corresponds to the residual block and is calculated as the difference between the original block and the prediction block.

To optimize the prediction efficiency, the unit 702 is configured to calculate coefficients for another value of the parameter σ, so that a corresponding prediction block can be obtained by the unit 703 and a corresponding prediction efficiency can be calculated by the blurring interpolation filter 302. After an iteration of these steps for different values of the parameter σ, the blurring interpolation filter 302 chooses the parameter σ that provides best prediction efficiency.

Alternatively, it is possible to pre-calculate Gaussian blurring filters with different values of the parameter σ, and to store them for different fractional positions. This allows saving some computational resources during optimization procedure.

The video decoder 400 comprises a blurring interpolation filter that is similar to the blurring interpolation filter 302 of the coder 200 shown in FIG. 7. The blurring interpolation filter of the video decoder 400 comprises similarly the units 701, 702 and 703 and similarly receives as an input a motion vector. This motion vector is obtained by the video decoder 400 as signalling information from the encoded video bit stream. The decoder 400 derives the value of the parameter σ that shall be used for generating the filter coefficients from fractional part of motion vector according to interpolation filter pattern.

The difference between the blurring interpolation filters of the video coder 200 and of the video decoder 400 preferably consists in the calculation of the prediction efficiency and in the optimization of the prediction efficiency by the iterative calculation of the prediction efficiency for different values of the parameter σ.

Figure 8:
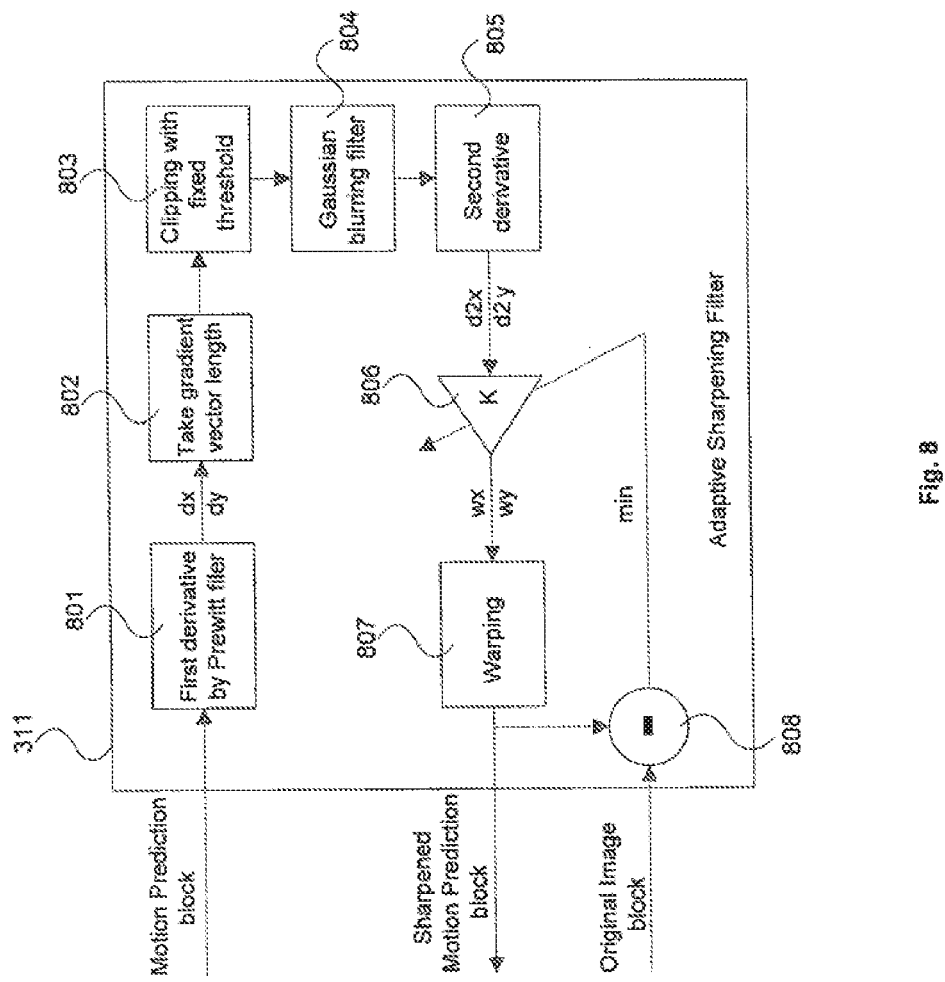
FIG. 8 shows an embodiment of a sharpening filter according to the present disclosure.

FIG. 8 shows an embodiment of an adaptive sharpening filter according to the present disclosure, and particularly an embodiment of the adaptive sharpening filter 311 of the video coder 200.

The sharpening filter 311 is preferably a non-linear filter. The usage of a non-linear sharpening filter, instead of a linear filter, is preferable for removing artifacts caused by the motion interpolation filter and the quantization of the reference block or frame. The choice of a non-linear filter can reduce the number of adaptive parameters of the sharpening filter 311. In particular, the non-linear filter can utilize only one adaptive parameter, so that the signalling overhead of the encoded video bit stream is reduced. While the present disclosure also covers the use of more than one adaptive parameter to control sharpening filter 311, a sharpening filter utilizing only one adaptive parameter is a particularly advantageous embodiment.

Particularly, the sharpening filter 311 comprises an edge map calculation unit 801, 802, a blurring filter 804, a high-pass filter 805, a scaling unit 806 and a warping unit 807.

The edge map calculation unit 801, 802 is adapted to generate an edge map of a source block, said source block being the reference block or the prediction block. The blurring filter 804 is adapted to blur the edge map of the source block. The high-pass filter 805 is adapted to generate, by high-pass filtering the blurred edge map, a derivative vector (d2x, d2y) for each position of the source block. The scaling unit 806 is adapted to generate a displacement vector (wx, wy) by scaling the derivative vector (d2x, d2y) with a sharpening strength coefficient k. The warping unit 807 is adapted to warp the prediction block based on the displacement vector (wx, wy).

Thereby, the adaptive parameter controlling the sharpening filter 800 is the sharpening strength coefficient k. The sharpening filter 800 shown in FIG. 8 is an embodiment of the present disclosure with only one adaptive parameter.

The edge map calculation unit 801, 802 can comprise a gradient vector unit 801 adapted to generate a gradient vector (dx, dy) for each position of the source block, and a gradient vector length unit 802 adapted to calculate the length of the gradient vector (dx, dy) of each position so as to generate the edge map of the source block. Thereby, this structure allows for the generation of an edge map that can be further processed by the blurring filter, the high-pass filter and the scaling unit to generate the warping displacement vector.

The gradient vector can be obtained by taking the first derivative separately for dx and dy, i.e. separately for both a horizontal and a vertical direction of the source block referred to as motion prediction block in FIG. 8, by applying a corresponding Prewitt filter in accordance with the following equations:

$$dx = \begin{bmatrix} 1 & 0 & -1 \\ 1 & 0 & -1 \\ 1 & 0 & -1 \end{bmatrix} * img$$

$$dy = \begin{bmatrix} 1 & 1 & 1 \\ 0 & 0 & 0 \\ -1 & -1 & -1 \end{bmatrix} * img$$

The edge map can be obtained by the gradient vector length unit 802 by calculating the gradient vector length in accordance with the following equation:

$$abs = \sqrt{dx^2 + dy^2}$$

Advantageously, the sharpening filter 311 comprises a clipping unit 803 adapted to clip the edge map of the source block, said clipping unit 803 being located between the edge map calculation unit 801, 802 and the blurring filter 804. Thereby, the clipping of the edge map with thresholds is advantageous in that it prevents the processing of extremely high and low values of warping vectors.

The step of blurring of the clipped edge map can be obtained by a blurring filter 804 in form of a Gaussian filter that can be defined as follows:

$$G = \begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 1 \end{bmatrix}$$

The high-pass filter is used to obtain, separately for d2x and d2y, the second derivative, for example according to the followings:

$$d^2x = \begin{bmatrix} 1 & 0 & -1 \end{bmatrix}$$

$$d^2y = \begin{bmatrix} 1 \\ 0 \\ -1 \end{bmatrix}$$

The displacement vector (wx,wy) is obtained by scaling the second derivative vector (d2x, d2y) with the coefficient k, wherein the coefficient k can be considered as sharpening strength, according to the following equations:

$$wx = k * d^2x$$

$$wy = k * d^2y$$

The warping unit 807 includes an interpolation filter that is e.g. a bi-linear interpolation filter to obtain sample values at fractional-pel positions. The warping unit 807 uses the displacement vector generated by the scaling unit 806. Thereby, the overall quality of the video coder is improved while at the same time providing an interpolation of the reference frame/block on desired fractional-pel positions.

A subtracting unit 808 is adapted to build the difference between the sharpened prediction block generated by the warping unit 807 and the current block, said current block corresponding to the block to be encoded. The subtracting unit 808 in fact generates the residual block. The sharpening filter 311 is adapted to find the optimum sharpening strength k for example by minimizing the residual block or by a cost criterion based e.g. on the rate-distortion.

The video decoder 400 comprises an adaptive sharpening filter that is similar to the adaptive sharpening filter 311 of the video coder 200 shown in FIG. 8. The difference between the adaptive sharpening filters of the video coder 200 and of the video decoder 300 preferably consists in the subtracting unit 808 and in this minimization of the residual block.

In the video decoder 400, the adaptive parameter, e.g. the coefficient k, is not set via the subtracting unit 808 and the minimization of the residual block. Instead, the adaptive parameter is set in the video decoder 400 preferably depending on fractional part of motion vector according to interpolation filter pattern.

The sharpening filter 400 comprises a warping based on a displacement vector calculated from the source block, which source block is referred to in FIG. 8 as motion prediction block.

According to an embodiment not shown in FIG. 8, the source block is the reference block of the reference frame stored in the frame buffer 207 such that the displacement vector (wx, wy) is derived from the reference block. Thereby, the reference block is used as source block for obtaining the displacement vectors, which are also called sharpening displacement vectors or warping displacement vectors. The warping is then applied to the prediction block using the obtained displacement vector. This embodiment is advantageous in that is saves computational resources on the encoder side.

According to the alternative embodiment of FIG. 8, the source block is the prediction block generated by the prediction unit 210, such that the displacement vector (wx, wy) is derived from the prediction block.

Thereby, choosing the prediction block as source block allows for the calculation of suitable displacement vectors for carrying out the warping of the prediction block. Also, the sharpening filter then only requires one input for the prediction block and a second input for the reference block is not needed.

With regard to the embodiment of FIG. 8, the sharpening filter can be controlled by just one coefficient, e.g. the sharpening strength k. This makes the adaptation process easier and requires fewer signalling bits for transmission than traditional linear Wiener-based adaptive filters. The usage of a non-linear sharpening filter instead of known linear filters is also more preferable for removing artifacts caused by motion interpolation filter and quantization of reference picture.

Figure 9:
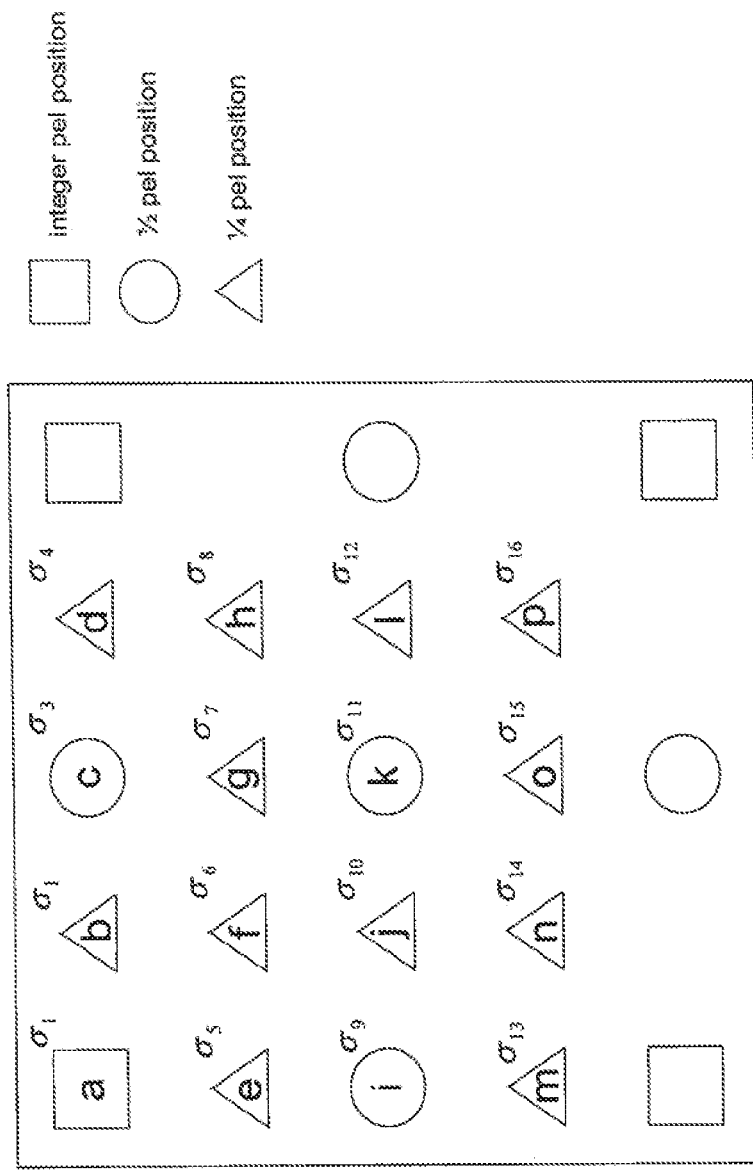
FIG. 9 shows an interpolation filter pattern for a blurring interpolation filter according to an embodiment of the present disclosure.

FIG. 9 shows an interpolation filter pattern of a blurring interpolation filter according to an embodiment of the present disclosure. The interpolation filter pattern shown in FIG. 9 defines, for each one of the integer-pel position and of the fractional-pel positions, that the associated interpolation filter is the blurring interpolation filter 302. Further on, the pattern of FIG. 9 defines, for each pel position, the value of the adaptive parameter, e.g. the value of the blurring coefficient σ.

The fractional space of motion vectors comprises several pel positions. In modern video codecs like H.264/AVC and H.265/HEVC, the motion vector has typically a ¼ pel resolution in both dimensions X and Y. FIG. 9 shows an embodiment of the present disclosure according to such a ¼ pel resolution. This resolution implies a total of 4×4=16 possible positions. These possible positions include one integer position identified as a square 'a', as well as 15 fractional positions b, c, d, e, f, g, h, i, j, k, l, m, n, o, p. The fractional positions comprise 3½ pel positions identified as circles c, i, k, as well as 12¼ pel positions identified as corresponding triangles. The pattern defines for each position a value σ1, . . . , σ16 for the blurring coefficient σ.

The interpolation filter pattern of FIG. 9 can be added by the coder 200 as signalling information to the encoded video bit stream, and can be correspondingly obtained by the decoder 400 from said encoded video bit stream. Performing an interpolation according to the interpolation filter pattern of FIG. 9 means that instead of using a conventional fixed filter with sharp step response, the blurring interpolation filter is applied for interpolation. The blurring coefficient σi associated with the fractional position is used as adaptive coefficient for the adaptive blurring interpolation filter.

The coefficients σi could be constant and predefined by offline training or chosen based e.g. on previous coding experimentations. It is allowed to have the same blurring coefficient σi in different fractional positions of the pattern. The coefficients σi may also be variable and adaptive at a sequence level, GOP level, frame level or region level. In that case additional signalling is required.

Figure 10:
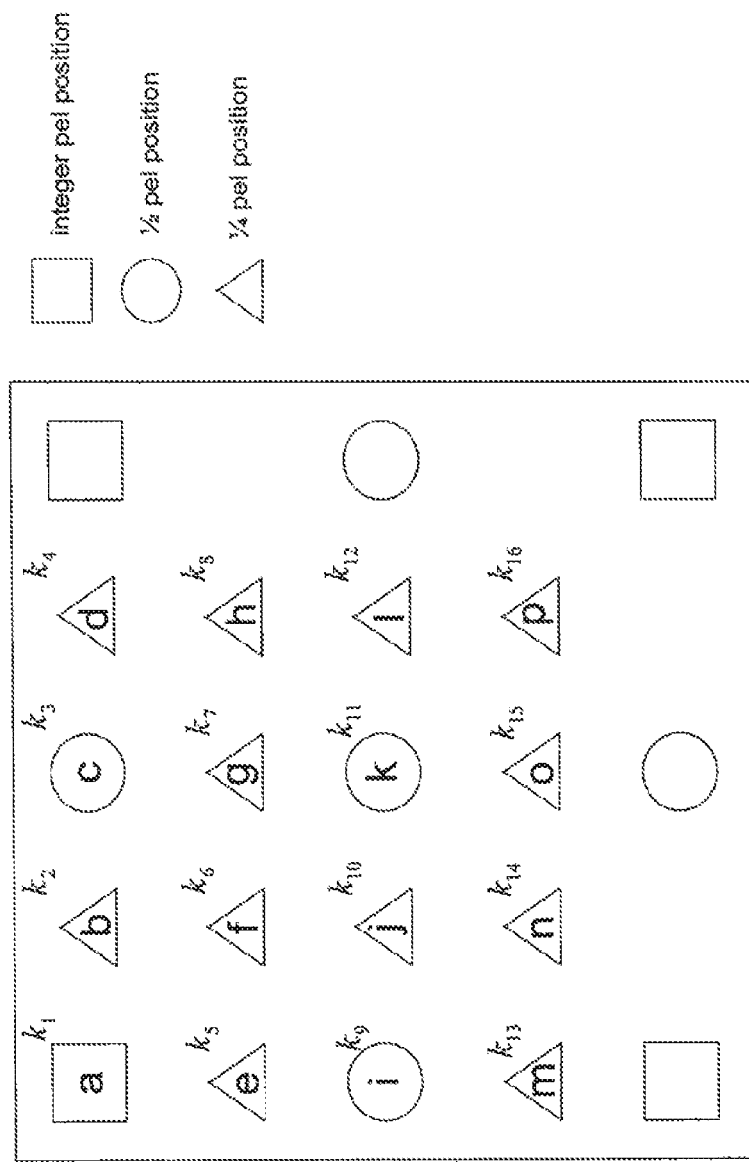
FIG. 10 shows an interpolation filter pattern for a sharpening filter according to an embodiment of the present disclosure.

FIG. 10 shows an interpolation filter pattern for a sharpening filter according to an embodiment of the present disclosure.

The interpolation filter pattern of FIG. 10 is similar to the pattern of FIG. 9, and defines, for each one of the integer-pel position and of the fractional-pel positions, that the associated interpolation filter is the sharpening filter 311. Further on, instead of defining the blurring coefficient σ of the blurring interpolation filter, said interpolation filter pattern of FIG. 10 defines, for each pel position, the value of the adaptive parameter, e.g. the value of the sharpening strength coefficient k.

Similarly to FIG. 9, the coefficients ki could be constant and predefined by offline training or chosen based e.g. on previous coding experimentations. It is allowed to have same sharpening coefficient ki in different fractional positions. The coefficients ki may also be variable and adaptive at a sequence level, GOP level, frame level or region level. In that case additional signalling is required.

Figure 11:
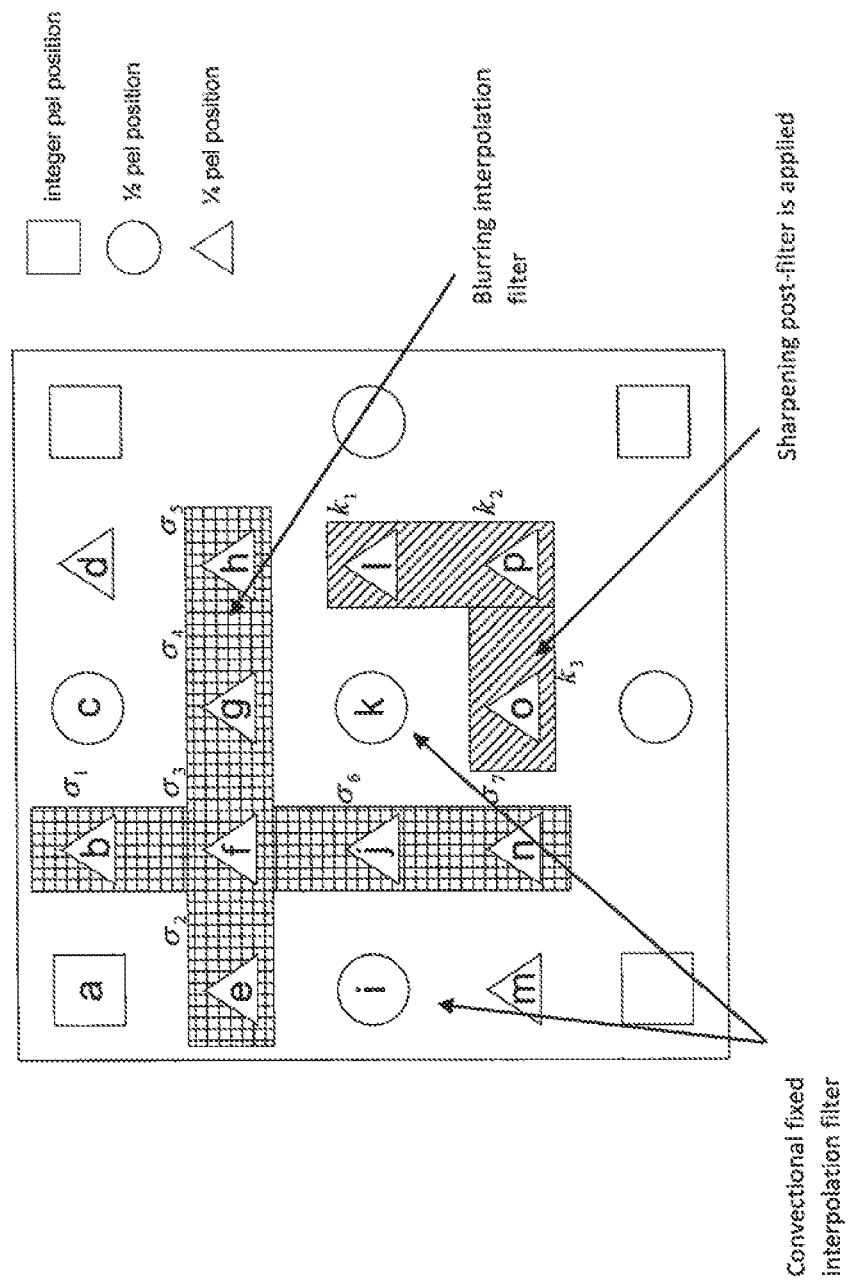
FIG. 11 shows a mixed interpolation filter pattern according to an embodiment of the present disclosure.

FIG. 11 shows an interpolation filter pattern according to a further embodiment of the present disclosure.

The pattern shown in FIG. 11 is in fact a mixed interpolation filter pattern that contains all three interpolation filter types. Some fractional pel positions b, e, f, g, h, j, n have an associated blurring parameter σ, which means that for these positions the blurring interpolation filter 302 shall be applied with the corresponding filter parameter σ1, . . . , σ7.

Some other pel positions l, o, p have an associated sharpening strength parameter k, which means that after an interpolation with the tap filter 303, i.e. with the conventional fixed filter tap, the adaptive sharpening filter 311 shall be applied with the corresponding parameter value k1, k2, k3.

Some other pel positions a, c, d, i, k, m have no associated parameter, i.e. the interpolation filter pattern does not associate any parameter value to these positions. This is interpreted by the decoder 400 in such a way that for these positions the tap filter 303, i.e. a conventional linear interpolation filter, is used.

By mixing all interpolation types in one interpolation filter pattern, it is now possible for the encoder to choose the most suitable interpolation for each particular case adaptively to the image content.

In the embodiments of FIGS. 9, 10 and 11, the fractional position of the motion vector can thus define in the interpolation filter type as well as, for the blurring interpolation filter 302 and for the sharpening filter 311, the adaptive parameter of the defined interpolation filter type. The interpolation filter pattern should be known both by the coder and by the decoder. It may be predefined or be adaptive and passed as side information, i.e. as signalling information of the encoded video bit stream.

Figure 12:
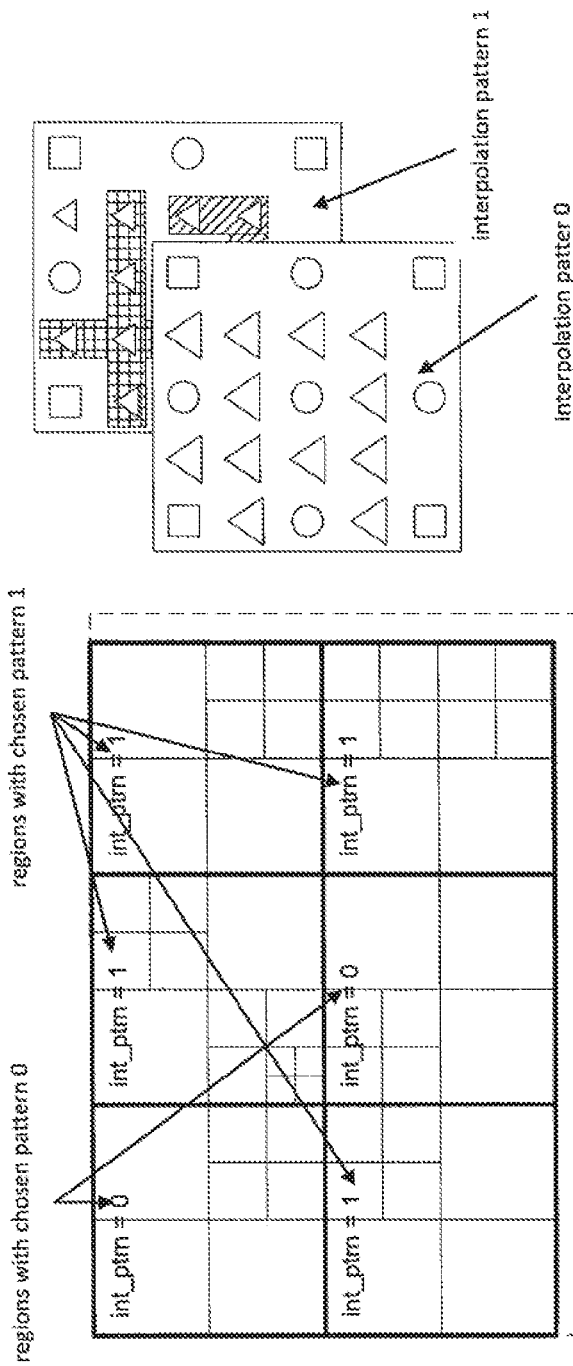
FIG. 12 shows an embodiment of the present disclosure with different interpolation filter patterns.

FIG. 12 shows an embodiment of the present disclosure with different interpolation filter patterns.

For some regions of a frame using the blurring interpolation filter 302 or the sharpening filter 311 may not be necessary. In such a case it is better to use the tap filter 303 for all fractional points. In other regions of the frame, it may be optimal to apply the blurring interpolation filter 302 or the sharpening filter 311.

To cover these variants it is proposed to define several different interpolation filter patterns for some local regions of the frame, choose the best interpolation filter pattern based e.g. on a cost criterion like rate distortion optimization, and signal to the decoder 400 what interpolation filter pattern should be used for the motion interpolation in the given region.

Correspondingly, FIG. 12 shows a frame comprising several regions, while e.g. two different interpolation filter patterns are used. The first pattern identified as 'interpolation pattern 0' defines that the tap filter 303, i.e. the conventional fixed interpolation filter, shall be used for each pel position, while the second pattern identified as 'interpolation pattern 1' is a mixed interpolation filter pattern as shown in FIG. 11.

In the embodiment of FIG. 12, the coder 200 chooses the first pattern for two regions, and the second pattern for the remaining four regions of the frame. During the encoding process, the best interpolation filter pattern can be chosen for each particular region—e.g. for each largest coding unit (LCU)—and can be signalled to the decoder in one bit, said bit determining the first or the second interpolation filter pattern.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfil the functions of several entities or items recited in the claims. The mere fact that certain measures are recited in the mutual different dependent claims does not indicate that a combination of these measures cannot be used in an advantageous implementation.

Additionally, statements made herein characterizing the disclosure refer to an embodiment of the disclosure and not necessarily all embodiments.

What is claimed is:

1. A video coder for predictive coding according to motion compensation, comprising:
   a frame buffer, configured to store at least one reference frame of a video stream; and
   a processor, configured to generate a prediction block of a current block of a current frame from a reference block of the at least one reference frame according to a motion vector having fractional-pel resolution;
   wherein generating the prediction block further comprises:
      selecting a filter type from a set of filter types including: a blurring interpolation filter, a tap filter, and a tap filter followed by a non-linear sharpening filter; and
      interpolating the reference block according to the fractional-pel resolution via the selected filter type.

2. The video coder according to claim 1, wherein the blurring interpolation filter and/or the non-linear sharpening filter is an adaptive filter configured to be controlled by at least one adaptive parameter.

3. The video coder according to claim 2, wherein the non-linear sharpening filter is configured to be controlled by a single adaptive parameter.

4. The video coder according to claim 1, wherein applying the non-linear sharpening filter comprises:
   generating an edge map of a source block, the source block being the reference block or the prediction block;
   blurring the edge map of the source block;
   generating, by high-pass filtering the blurred edge map, a derivative vector for each position of the source block;
   generating a displacement vector by scaling the derivative vector with a sharpening strength coefficient; and
   warping the prediction block based on the displacement vector.

5. The video coder according to claim 4, wherein the blurring interpolation filter and/or the non-linear sharpening filter is an adaptive filter configured to be controlled by at least one adaptive parameter, and wherein the at least one adaptive parameter of the non-linear sharpening filter includes the sharpening strength coefficient.

6. The video coder according to claim 4, wherein the processor is further configured to select the sharpening strength coefficient that minimizes a residual block, the residual block being the difference between the current block and the prediction block outputted by the non-linear sharpening filter, or based on a cost criterion.

7. The video coder according to claim 2, wherein the blurring interpolation filter comprises a single adaptive parameter.

8. The video coder according to claim 7, wherein the adaptive parameter of the blurring interpolation filter includes a blurring coefficient.

9. The video coder according to claim 8, wherein the blurring interpolation filter is a Gaussian filter or a bi-linear filter.

10. The video coder according to claim 9, wherein applying the blurring interpolation filter comprises:
calculating Gaussian filter coefficients based on a standard deviation; and
generating as an output of the blurring interpolation filter, a prediction block by using the calculated Gaussian filter coefficients.

11. The video coder according to claim 9, further comprising:
a storage, configured to store a pre-calculated set of Gaussian filters coefficients based on different standard deviations; and
wherein applying the blurring interpolation filter comprises generating, as an output of the blurring interpolation filter, a prediction block by using one of the pre-calculated set of Gaussian filter coefficients.

12. The video coder according to claim 8, wherein the processor is further configured to select the blurring coefficient that minimizes a residual block, the residual block being the difference between the current block and the prediction block outputted by the blurring interpolation filter, or based on a cost criterion.

13. The video coder according to claim 1, wherein the tap filter is a fixed long tap filter with sharp step response.

14. The video coder according to claim 2, wherein a respective integer-pel position and a respective fractional-pel position corresponding to the motion vector are associated with the blurring interpolation filter, the tap filter, the tap filter followed by the non-linear sharpening filter, and/or a given value of the at least one adaptive parameter.

15. The video coder according to claim 14,
wherein the processor is further configured to generate an encoded video bit stream, and to specify, as signalling information in the encoded video bit stream, an interpolation filter type, the given value of the at least one adaptive parameter, and the respective integer-pel position or the respective fractional-pal position.

16. The video coder according to claim 1, wherein selecting the filter type is based on an integer-pel position or a fractional-pel position.

17. The video coder according to claim 1, further comprising:
at least one interpolation filter pattern defining, for each one of an integer-pel position and fractional-pel positions, an associated interpolation filter type and/or a value of at least one adaptive parameter.

18. The video coder according to claim 1, further comprising:
a plurality of interpolation filter patterns;
wherein the processor is further configured to select one of the plurality of interpolation filter patterns.

19. The video coder according to claim 17,
wherein the processor is further configured to generate an encoded video bit stream and to add, as signalling information in the encoded video bit stream, the at least one interpolation filter pattern.

20. The video coder according to claim 17, wherein the at least one interpolation filter pattern comprises a plurality of interpolation filter patterns; and
wherein the processor is further configured to add, as signalling information in an encoded video bit stream, selection information about a to-be-selected interpolation filter pattern.

21. The video coder according to claim 17, wherein the processor is further configured to add signalling information about a to-be-selected interpolation filter pattern for each prediction block, for an arbitrary or regular region of the frame, at a frame level, at a group of pictures (GOP) level, at a picture parameter set (PPS) level, or at a sequence parameter set (SPS) level.

22. A method for predictive coding according to motion compensation, comprising:
storing, by a video coder, at least one reference frame of a video stream; and
generating, by the video coder, a prediction block of a current block of a current frame from a reference block of the at least one reference frame according to a motion vector having fractional-pel resolution;
wherein generating the prediction block further comprises:
selecting a filter type from a set of filter types including: a blurring interpolation filter, a tap filter, and a tap filter followed by a non-linear sharpening filter; and
interpolating the reference block according to the fractional-pel resolution via the selected filter type.

23. A video decoder for decoding an encoded video bit stream obtained by predictive coding according to motion compensation, comprising:
a frame buffer, configured to store at least one reference frame obtained from the encoded video bit stream; and
a processor, configured to generate a prediction block of a current block of a current frame from a reference block of the at least one reference frame according to a motion vector having fractional-pel resolution;
wherein generating the prediction block further comprises:
selecting a filter type from a set of filter types including: a blurring interpolation filter, a tap filter, and a tap filter followed by a non-linear sharpening filter; and
interpolating the reference block according to the fractional-pel resolution via the selected filter type.

24. The video decoder according to claim 23, wherein the blurring interpolation filter and/or the non-linear sharpening filter is an adaptive filter configured to be controlled by at least one adaptive parameter.

25. The video decoder according to claim 23, wherein selecting the filter type is based on an integer-pel position or a fractional-pel position.

26. The video decoder according to claim 23, wherein selecting the filter type is according to an interpolation filter pattern; and
wherein the interpolation filter pattern defines, for a respective integer-pel position and a respective fractional-pel position of the motion vector, an interpolation filter type and/or a value of at least one adaptive parameter.

27. The video decoder according to claim 26,
wherein the processor is further configured to obtain from the encoded video bit stream, as signalling information, the interpolation filter pattern.

28. The video decoder according to claim 26,
wherein the processor is further configured to obtain from the encoded video bit stream, as signalling information, a plurality of interpolation filter patterns as well as selection information about a to-be-selected interpolation filter pattern;
wherein the processor is further configured to select one of the obtained interpolation filter patterns according to the obtained selection information; and
wherein selecting the filter type is according to the selected interpolation filter pattern.

29. The video decoder according to claim 26,
wherein the processor is further configured to obtain from the encoded video bit stream, as signalling information, selection information about a to-be-selected interpolation filter pattern;
wherein the processor is further configured to select one of a plurality of pre-stored interpolation filter patterns according to the obtained selection information; and
wherein selecting the filter type is according to the selected interpolation filter pattern.

30. The video decoder according to claim 24,
wherein the processor is further configured to obtain the signalling information about a to-be-selected interpolation filter pattern for each prediction block, for an arbitrary or regular region of the frame, at a frame level, at a group of pictures (GOP) level, at a picture parameter set (PPS) level,_ or at a sequence parameter set (SPS) level.

31. A method for decoding an encoded video bit stream obtained by predictive coding according to motion compensation, comprising:
storing, by a video decoder, at least one reference frame obtained from the encoded video bit stream; and
generating, by the video decoder, a prediction block of a current block of a current frame from a reference block of the reference frame according to a motion vector having fractional-pel resolution;
wherein generating the prediction block further comprises:
selecting a filter type from a set of filter types including: a blurring interpolation filter, a tap filter, and a tap filter followed by a non-linear sharpening filter; and
interpolating the reference block according to the fractional-pel resolution via the selected filter type.

* * * * *